June 3, 1958    E. FERMI ET AL    2,837,477
CHAIN REACTING SYSTEM

Filed Feb. 16, 1945    10 Sheets-Sheet 1

Witnesses:
Herbert E. Metcalf
Francis W. Test

INVENTORS:
Enrico Fermi
Miles C. Leverett
BY
Robert A. [Attorney]
Attorney:

June 3, 1958 E. FERMI ET AL 2,837,477
CHAIN REACTING SYSTEM
Filed Feb. 16, 1945 10 Sheets-Sheet 3

Witnesses:
Herbert E. Metcalf
Francis W. Test

INVENTORS:
Enrico Fermi
BY Miles C. Leverett

Robert A. Lavender
Attorney.

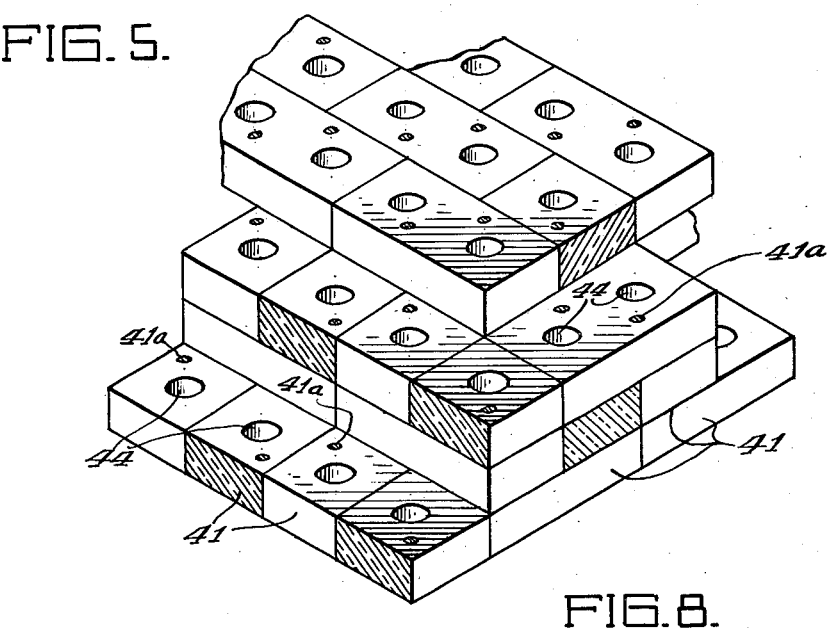
FIG. 5.
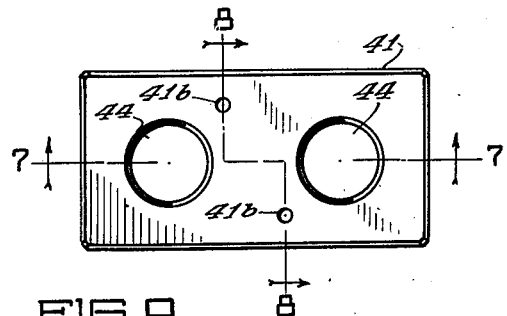
FIG. 6.
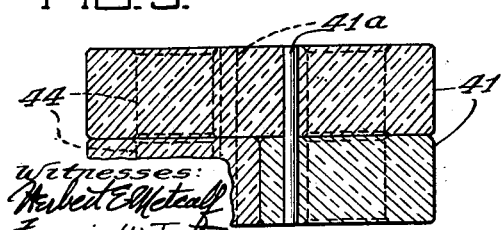
FIG. 9.
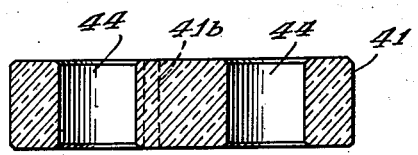
FIG. 8.
FIG. 7.

June 3, 1958 E. FERMI ET AL 2,837,477
CHAIN REACTING SYSTEM
Filed Feb. 16, 1945 10 Sheets-Sheet 6
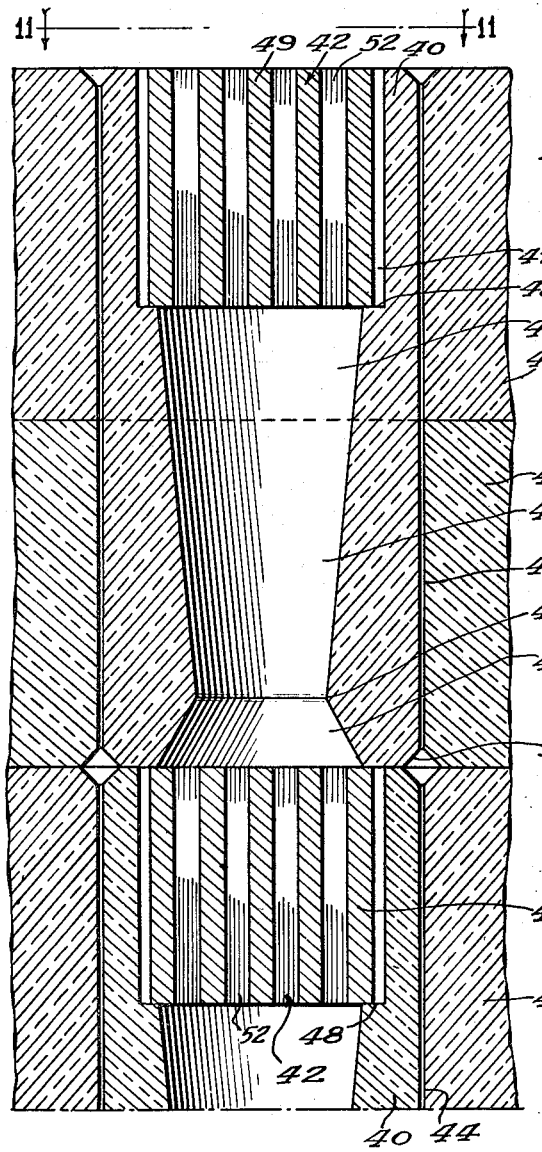
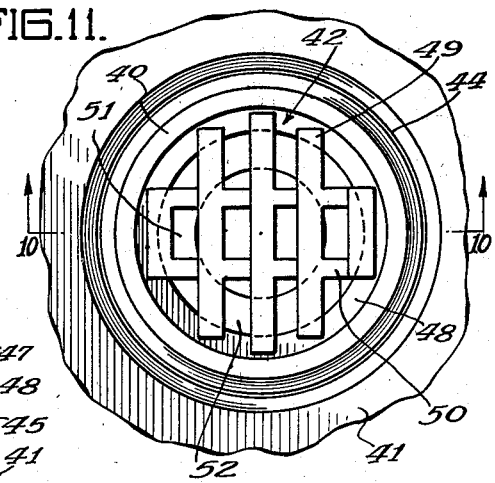
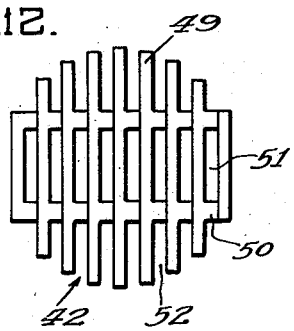
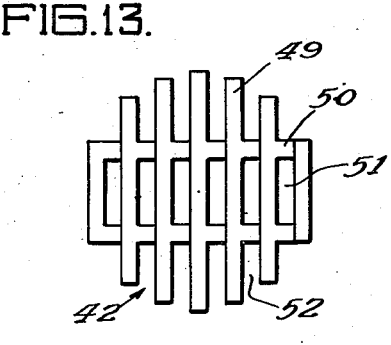
INVENTORS:
Enrico Fermi
BY Miles C. Leverett
Robert A. Leverett
Attorney.

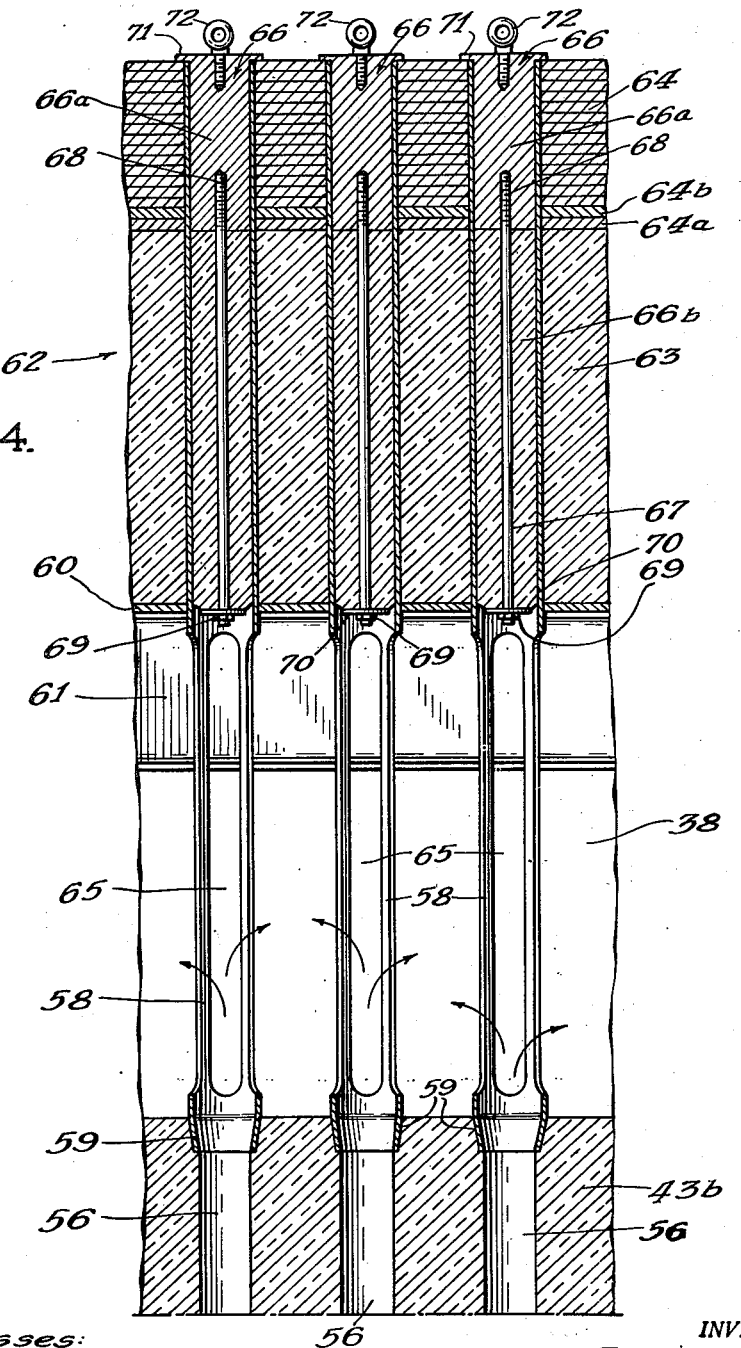

June 3, 1958     E. FERMI ET AL     2,837,477
CHAIN REACTING SYSTEM
Filed Feb. 16, 1945     10 Sheets-Sheet 8

INVENTORS:
Enrico Fermi
Miles C. Leverett

INVENTORS:
Enrico Fermi
Miles C. Leverett

2,837,477
CHAIN REACTING SYSTEM

Enrico Fermi, Santa Fe, N. Mex., and Miles C. Leverett, Oak Ridge, Tenn., assignors to the United States of America as represented by the United States Atomic Energy Commission Application February 16, 1945, Serial No. 578,278

2 Claims. (Cl. 204—193.2)

The present invention relates to the subject of nuclear fission and more particularly to a plant wherein the heat generated as a result of the fission process can be removed at a rapid rate and preferably in such a manner that it can be utilized for the production of power. In addition, the products resulting from the fission process in the plant can readily be removed without requiring complete dismantling of the plant.

The fission process is effected in a structure commonly referred to as a chain reacting pile or reactor which may comprise a plurality of bodies containing natural uranium geometrically arranged in an efficient neutron slowing material, such as carbon in the form of graphite.

Natural uranium contains both uranium isotopes $U^{235}$ and $U^{238}$ in the ratio of 1 to 139. Consider the chain reaction as starting with the fast neutrons originating by nuclear fission in a uranium body. These neutrons are set free with very high energy of the order of magnitude of one million electron volts average and are therefore not in condition to be utilized efficiently to create new thermal neutron fissions in $U^{235}$ when it is mixed with a considerable quantity of $U^{238}$, particularly as in the case of natural uranium. The energies of the fission-released neutrons are so high that most of the latter would tend to be absorbed by the $U^{238}$ nuclei or lost from the system, and yet the energies are not generally high enough for production of fission by more than a small fraction of the neutrons so absorbed. For neutrons of thermal energies, however, the absorption cross-section of $U^{235}$, to produce fission, rises a great deal more than the simple capture cross-section of $U^{238}$; so that under the stated circumstances the fast fission neutrons, after they are created, must be slowed down to thermal energies before they are most effective to produce fresh fission by reaction with additional $U^{235}$ atoms. If a system can be made in which neutrons are slowed down without much absorption until they reach thermal energies and then mostly enter into uranium rather than into any other element, a self-sustaining nuclear chain reaction can be obtained, even with natural uranium. Light elements, such as deuterium, beryllium, oxygen or carbon, the latter in the form of graphite, can be used as slowing agents. A special advantage of the use of the light elements mentioned for slowing down fast fission neutrons is that fewer collisions are required for slowing than is the case with heavier elements, and furthermore, the above-enumerated elements have very small neutron capture probabilities, even for thermal neutrons. Hydrogen would be most advantageous were it not for the fact that there may be a relatively high probability of neutron captured by the hydrogen nucleus. Both beryllium and deuterium are expensive and not readily available in large quantities. Carbon in the form of graphite is a relatively inexpensive, practical, and readily available agent for slowing fast neutrons to thermal energies. Recently, beryllium has been made available in sufficiently large quantities for test as to suitability for use as a neutron slowing material in a system of the type to be described. It has been found to be in every way as satisfactory as carbon.

However, in order for the premise to be fulfilled that the fast fission neutrons be slowed to thermal energies in a slowing medium with a minimum of absorption in the $U^{238}$ isotope of the uranium, certain types of physical structure should be utilized for the most efficient reproduction of neutrons, as precautions must be taken to reduce various neutron losses and thus to conserve neutrons for the chain reaction if a self-sustaining system is to be attained.

The ratio of the number of fast neutrons produced by the fissions, to the original number of fast neutrons creating the fissions, in a system of infinite size using specific materials is called the reproduction or multiplication factor of the system and is denoted by the symbol $K$. This factor may be determined experimentally for any particular geometry by the process described in a copending application of E. Fermi, Serial No. 534,129, filed May 4, 1944, now Patent No. 2,780,595. If $K$ can be made sufficiently greater than unity to create a net gain in neutrons and the system made sufficiently large so that this gain is not entirely lost by leakage from the exterior surface of the system, then a self-sustaining chain reacting system can be built to produce power by nuclear fission of natural uranium. The neutron reproduction ratio $r$ in a system of finite size differs from $K$ by the leakage factor, and must be sufficiently greater than unity to permit the neutron density to rise exponentially. Such a rise will continue indefinitely if not controlled at a desired density corresponding to a desired power output.

It is therefore the main object of our invention to construct a system comprising uranium and a slowing medium so that neutron losses are reduced to such an extent that a controllable self-sustaining neutron chain fission reaction is obtained therein, with resultant regulated production of neutrons, liberation of power in the form of heat and other forms, the production of radioactive fission products and new elements both radioactive and stable produced by the absorption of neutrons.

During the interchange of neutrons in a system comprising bodies of uranium of any size in a slowing medium, neutrons may be lost in four ways; that is, by absorption in the uranium metal or compound without producing fission, by absorption in the slowing down material, by absorption in impurities present in the system, and by leakage from the system. These losses will be considered in the order mentioned.

Natural uranium, particularly by reason of its $U^{238}$ content, has an especially strong absorbing power for neutrons when they have been slowed down to moderate energies. The absorption in uranium at these energies is termed the uranium resonance absorption or capture. It is caused by the isotope $U^{238}$ and does not result in fission but creates the isotope $U^{239}$ which by two successive beta emissions forms the relatively stable nucleus $94^{239}$. It is not to be confused with absorption or capture of neutrons by impurities, referred to later. Neutron resonance absorption in uranium may take place either on the surface of the uranium bodies, in which case the absorption is known as surface resonance absorption, or it may take place further in the interior of the uranium body, in which case the absorption is known as volume resonance absorption. It will be appreciated that this classification of resonance absorptions is merely a convenient characterization of observed phenomena, and arises, not because the neutron absorbing power of a $U^{238}$ nucleus is any greater when the nucleus is at the surface of a body of metallic or combined uranium, but because the absorbing power of $U^{238}$ nuclei for neutrons of certain particular energies is inherently so high that practically all neutrons that already happen to have those energies, called resonance energies as explained above, are absorbed almost immediately upon their arrival in the body of uranium metal or uranium compound, and thus in effect are absorbed at the surface of such body. Volume resonance absorption is due to the fact that some neutrons make collisions inside the uranium body and may thus arrive at resonance energies therein. After successfully reaching thermal velocities, about 40 percent of the neutrons are also subject to capture by $U^{238}$ without fission, to produce $U^{239}$ and eventually $94^{239}$.

It is possible, by proper physical arrangement of the materials, to reduce substantially uranium resonance absorption. By the use of light elements as described above for slowing materials, a relatively large increment of energy loss is achieved in each collision and therefore fewer collisions are required to slow the neutrons to thermal energies, thus decreasing the probability of a neutron being at a resonance energy as it enters a uranium atom. During the slowing process, however, neutrons are diffusing through the slowing medium over random paths and distances so that the uranium is not only exposed to thermal neutrons but also to neutrons of energies varying between the emission energy of fission and thermal energy. Neutrons at uranium resonance energies will, if they enter uranium at these energies, be absorbed on the surface of a uranium body whatever its size, giving rise to surface absorption. Any substantial reduction of overall surface of the same amount of uranium relative to the amount of slowing material (i. e. the amount of slowing medium remaining unchanged) will reduce surface absorption, and any such reduction in surface absorption will release neutrons to enter directly into the chain reaction; i. e., will increase the number of neutrons available for further slowing and thus for reaction with $U^{235}$ to produce fission.

For a given ratio of slowing material to uranium, surface resonance absorption losses of neutrons in the uranium can be reduced by a large factor from the losses occurring in a mixture of fine uranium particles and a slowing medium, if the uranium is aggregated into substantial masses in which the mean radius is at least 0.25 centimeter for natural uranium metal and when the mean spatial radius of the bodies is at least 0.75 centimeter for the oxide of natural uranium ($UO_2$). An important gain is thus made in the number of neutrons made directly available for the chain reaction. A similar gain is made when the uranium has more than the natural content of fissionable material. Consequently, where it is desired to secure a maximum K, we place the uranium in the system in the form of spaced uranium masses or bodies of substantial size, preferably either of metal, oxide, carbide, or combinations thereof. The uranium bodies can be in the form of layers, rods or cylinders, cubes or spheres, or approximate shapes, dispersed throughout the graphite, preferably in some geometric pattern. The term geometric is used to mean any pattern or arrangement wherein the uranium bodies are distributed in the graphite or other moderator with at least either a roughly uniform spacing or with a roughly systematic non-uniform spacing, and are at least roughly uniform in size and shape or are systematic in variations of size or shape to produce a volume pattern conforming to a roughly symmetrical system. If the pattern is a repeating or rather exactly regular one, a system embodying it may be conveniently described as a lattice structure. Optimum conditions are obtained with natural uranium by using a lattice of metal spheres.

The number of neutrons made directly available to the chain reaction by aggregating the uranium into separate bodies spaced through the slowing medium is a critical factor in obtaining a self-sustaining chain reaction utilizing natural uranium and graphite. The K factor of a mixture of fine uranium particles in graphite, assuming both of them to be theoretically pure, would only be about .785. Actual K factors as high as 1.07 have been obtained using aggregation of natural uranium in the best known geometry. With completely pure materials and uranium aggregates shaped as spheres it is possible to obtain K factors as high as 1.10 with a carbon moderator, 1.18 with a beryllium moderator and 1.3 with $D_2O$ as a moderator.

Still higher K factors can be obtained by the use of aggregation in the case of uranium having more than the naturally occurring content of fissionable materials such as $U^{233}$, $U^{235}$ or $94^{239}$. Adding such fissionable material is termed enrichment of the uranium.

It is thus clearly apparent that the aggregation of the uranium into masses separated in the slowing material is one of the most important, if not the most important factor entering into the successful construction of a self-sustaining chain reaction system utilizing relatively pure natural uranium in a slowing material in the best geometry at present known, and is also important in obtaining high K factors when enrichment of the uranium is used.

The thermal neutrons are also subject to capture by the slowing material. While carbon and beryllium have very small capture cross-sections for thermal neutrons, and deuterium still smaller, an appreciable fraction of thermal neutrons (about 10 percent of the neutrons present in the system under best conditions with graphite) is lost by capture in the slowing material during diffusion therethrough. It is therefore desirable to have the neutrons reaching thermal energy promptly enter uranium.

In addition to the above-mentioned losses, which are inherently a part of the nuclear chain reaction process, impurities present in both the slowing material and the uranium add a very important neutron loss factor in the chain. The effectiveness of various elements as neutron absorbers varies tremendously. Certain elements such as boron, cadmium, samarium, gadolinium, and some others, if present even in a few parts per million, could prevent a self-sustaining chain reaction from taking place. It is highly important, therefore, to remove as far as possible all impurities capturing neutrons to the detriment of the chain reaction from both the slowing material and the uranium. If these impurities, solid, liquid, or gaseous, and in elemental or combined form, are present in too great quantity, in the uranium bodies or the slowing material or in, or by absorption from, the free spaces of the system, the self-sustaining chain reaction cannot be attained. The amounts of impurities that may be permitted in a system, vary with a number of factors, such as the specific geometry of the system, and the form in which the uranium is used—that is, whether natural or enriched, whether as metal or oxide—and also factors such as the weight ratios between the uranium and the slowing down material, and the type of slowing down or moderating material used—for example, whether deuterium, graphite or beryllium. Although all of these considerations influence the actual permissible amount of each impurity material, it has fortunately been found that, in general, the effect of any given impurity or impurities can be correlated directly with the weight of the impurity present and with the K factor of the system, so that knowing the K factor for a given geometry and composition, the permissible amounts of particular impurities can be readily computed without taking individual account of the specific considerations named above. Different impurities are found to effect the operation to widely different extents; for example, relatively considerable quantities of elements such as hydrogen may be present, and, as previously suggested, the uranium may be in the form of oxide, such as $UO_2$ or $U_3O_8$, or carbide, although the metal is preferred. Nitrogen may be present to some extent, and its effect on the chain reaction is such that the neutron reproduction ratio of the system may be changed by changes in atmospheric pressure. This effect may be eliminated by enclosing or evacuating the system if desired. In general, the inclusion of combined nitrogen is to be avoided.

The effect of impurities on the optimum reproduction factor K may be conveniently evaluated to a good approximation, simply by means of certain constants known as "danger coefficients" which are assigned to the various elements. These danger coefficients for the impurities are each multiplied by the percent by weight of the corresponding impurity, and the total sum of these products gives a value known as the total danger sum. This total danger sum is subtracted from the reproduction factor K as calculated for pure materials and for the specific geometry under consideration.

The danger coefficients are defined in terms of the ratio of the weight of impurity per unit mass of uranium and are based on the cross-section for absorption of thermal neutrons of the various elements. These values may be obtained from physics textbooks on the subject and the danger coefficient computed by the formula $$\frac{\sigma_i}{\sigma_u} \cdot \frac{A_u}{A_i}$$

where $\sigma_i$ represents the cross section for the impurity and $\sigma_u$ the cross-section for the uranium, $A_i$ the atomic weight of the impurity and $A_u$ the atmoic weight for uranium. If the impurities are in the carbon, they are computed as their percent of the weight of the uranium of the system.

Presently known values for danger coefficients for some elements are given in the following table, wherein the elements are assumed to have their ntural isotopic constitution unless otherwise indicated, and are conveniently listed according to their chemical symbols:

| Element | Danger Coefficient | Element | Danger Coefficient |
|---|---|---|---|
| $H^1$ | 10 | Mo | 1.0 |
| $D^2$ | 0.01 | Ru | 2 |
| He | 0 | Rh | 50 |
| Li | 310 | Pd | 2 |
| Be | 0.04 | Ag | 18 |
| B | 2150 | Cd | 870 |
| C | 0.012 | In | 54.2 |
| N | 4.0 | Sn | 0.18 |
| O | 0.002 | Sb | 1.6 |
| F | 0.02 | Te | 1 |
| Ne | 3 | I | 1.6 |
| Na | 0.65 | Xe | 6 |
| Mg | 0.48 | Cs | 8.7 |
| Al | 0.30 | Ba | 0.30 |
| Si | 0.26 | La | 2.4 |
| P | 0.3 | Ce | 2.4 |
| S | 0.46 | Pr | 2.4 |
| Cl | 31 | Nd | 17 |
| A | 0.8 | Sm | 1430 |
| K | 2.1 | Eu | 435 |
| Ca | 0.37 | Gd | 6320 |
| Sc | 7 | Tb | 20 |
| Ti | 3.8 | Dy | 200 |
| V | 4 | Ho | 10 |
| Cr | 2 | Er | 40 |
| Mn | 7.5 | Tm | 20 |
| Fe | 1.5 | Yb | 10 |
| Co | 17 | Lu | 30 |
| Ni | 3 | Hf | 20 |
| Cu | 1.8 | Ta | 4.6 |
| Zn | 0.61 | W | 2.7 |
| Ga | 1 | Re | 18 |
| Ge | 5 | Os | 1.7 |
| As | 2 | Ir | 70 |
| Se | 6.3 | Pt | 2.5 |
| Br | 2.5 | Au | 16 |
| Kr | 6 | Hg | 82 |
| Rb | 0.4 | Tl | 0.5 |
| Sr | 0.57 | Pb | 0.03 |
| Y | 0.4 | Bi | 0.0025 |
| Zr | 0.13 | Th | 1.1 |
| Cb | 0.4 | | |

Where an element is necessarily used in an active part of a system, it is still to be considered as an impurity; for example, in a structure where the uranium bodies consist of uranium oxides, the actual factor K would ordinarily be computed by taking that fact into account using as a base K a value computed for theoretically pure uranium.

As a specific example, if the materials of the system under consideration have .0001 part by weight of Co and Ag, the total danger sum in K units for such an analysis would be:

.0001×17+.0001×18=.0035 K unit

This would be a rather unimportant reduction in the reproduction factor K unless the reproduction factor for a given system, without considering any impurities, is very nearly unity. If, on the other hand, the impurities in the uranium in the previous example had been Li, Co, and Rh, the total danger sum would be:

.0310+.0017+.0050=.0377 K unit

This latter reduction in the reproduction factor for a given system would be serious and might well reduce the reproduction factor below unity for certain geometries so as to make it impossible to effect a self-sustaining chain reaction with natural uranium and graphite, but might still be permissible when using enriched uranium in a system having a high K factor.

The size of the system will vary, depending upon the K factor of the system, and upon other things. If the reproduction factor K is greater than unity, the number of neutrons present will increase exponentially and indefinitely, provided the structure is made sufficiently large. If, on the contrary, the structure is small, with a large surface-to-volume ratio, there will be a rate of loss of neutrons from the structure by leakage through the outer surfaces, which may overbalance the rate of neutron production inside the structure so that a chain reaction will not be self-sustaining. For each value of the reproduction factor K greater than unity, there is thus a minimum overall size of a given structure known as the critical size, above which the rate of loss of neutrons by diffusion to the walls of the structure and leakage away from the structure is less than the rate of production of neutrons within the system, thus making the chain reaction self-sustaining. The rate of diffusion of neutrons away from a large structure in which they are being created through the exterior surface thereof may be treated by mathematical analysis when the value of K and certain other constants are known, as the ratio of the exterior surface to the volume becomes less as the structure is enlarged.

In the case of a spherical structure employing uranium bodies imbedded in graphite in the geometries disclosed herein and without an external reflector, the following formula gives the critical over all radius (R) in feet:

$$K-1=\frac{C}{R^2}$$

where C is a constant that varies slightly with geometry of the lattice and for normal graphite lattices may have a value close to 7.4.

For a rectangular parallelepiped structure rather than spherical, the critical size can be computed from the formula $$K-1=C\left(\frac{1}{a^2}+\frac{1}{b^2}+\frac{1}{c^2}\right)$$

where a, b, and c are the lengths of the sides in feet. The critical size for a cylindrical structure is given by the formula, irrespective of the shape of the uranium bodies cylinder height h ft.
radius R ft.

$$K-1=C\left(\frac{1}{h^2}+\frac{.59}{R^2}\right)$$

However, when critical size is attained, by definition no rise in neutron density can be expected. It is therefore necessary to increase the size of the structure beyond the critical size but not to the extent that the period for doubling of the neutron density is too short, as will be explained later. A desirable reproduction ratio (r) for an operating structure with all control absorbers removed and at the temperature of operation is about 1.005. The size at which this reproduction ratio can be obtained may be computed from modifications of the above formulae for critical size. For example, for spherical active structures the formula $$K - r = \frac{C}{R^2}$$

may be used to find R when K is known and $r$ is the reproduction ratio and is somewhat over unity. The same formula will, of course, give $r$ for given structures for which K and R are known.

Critical size may be attained with a somewhat smaller structure by utilizing a neutron reflecting medium surrounding the surface of the active structure. For example, a 2 foot thickness of graphite having low impurity content, completely surrounding a spherical structure is effective in reducing the diameter of the uranium bearing portion by as much as 2 feet, resulting in a considerable saving of uranium or uranium compound.

The ratio of the average number of fast neutrons produced by fission of a fissionable isotope to the average number of thermal neutrons absorbed by the composition of which the fissionable isotope is a component is a constant for any particular composition commonly referred to as the "eta constant." Since fission of $U^{235}$ produces about 2 fast neutrons per fission the eta constant for pure $U^{235}$ would be about 2 assuming that all neutrons produced were absorbed to produce fission. However, $U^{235}$ is usually used in conjunction with $U^{238}$ and generally comprises but a very small portion of the composition subjected to treatment and accordingly this average constant is reduced because of absorptions by the composition by $U^{238}$ which does not produce fission. For natural uranium an average of about 1.32 new fast neutrons will be produced by fission of the nuclei of the $U^{235}$ isotope and this value is the "eta" constant for natural uranium. For fissionable materials other than natural uranium containing different concentrations of $U^{235}$ and $U^{238}$ or different fissionable isotopes such as $94^{239}$ the value of the eta constant will be different.

The new fast neutrons resulting from the fissions in the isotope $U^{235}$ pass through the same cycle as just described, there being a certain portion which will produce fast fission, some which will be lost to the chain reaction and others which will be slowed to thermal energy to be absorbed by uranium without fission.

By arranging the uranium in bodies or masses of suitable shape and sufficient size to minimize passage of neutrons having energies corresponding to or above resonance energies of $U^{238}$ through the uranium preferably in a regular geometry resembling a crystal lattice in chemical parlance and selecting the correct volume ratio of uranium to slowing material, and, further, by suitably limiting the impurities in the uranium and the slowing material and by building the structure to a proper size, it is possible to produce in each generation more fast neutrons by fission than are originally present to start the chain, so as to perpetuate the chain reaction in the system.

As the chain reacting pile is then capable of producing more fast fission neutrons at a greater rate than the rate at which neutrons are lost from the system, there would be an exponential rise in the neutron density, theoretically to infinity, as the pile is operated unless the rise is controlled. Removable neutron absorbers, or "impurities" in the form of control rods, can be used to control the exponential rise beyond desired limits by inserting such rods into the pile. The point at which the exponential rise is stopped is a matter of choice, and, of course, will depend upon the desired power output as well as considerations involving safety and efficiency of heat removal. It is obvious that the rate of production of heat within the pile will depend upon the operating neutron density in the system. The higher the density, the greater the production of heat in the system. Moreover the permissible power output of the reactor is limited by the rate of heat removal and therefore the permissible power output may be seriously reduced where the cooling media is correlated through improper zones of the reactor. We have found that about 92 percent of the total heat generated in a chain reacting system originates in the uranium, about 6 percent originates in the slowing medium, where graphite is used as such medium. The remaining 2 percent is generated outside the pile; that is, in the surrounding structures. Accordingly we have found that maximum output of power may be secured by passage of the coolant into contact with or closely adjacent to the uranium bodies.

Following is a table showing more specifically the type and locale of the heat generated in the pile:

1. SUMMARY BY TYPE

|  | M. e. v./fission | Percent |
| --- | --- | --- |
| Gamma radiation | 23 | 11 |
| Beta radiation | 11 | 6 |
| Kinetic Energy of fission fragments | 159 | 79 |
| Kinetic Energy of neutrons | 7 | 4 |
|  | 200 | 100 |

2. SUMMARY BY LOCALE WHERE HEAT IS GENERATED

|  | M. e. v./fission | Percent |
| --- | --- | --- |
| In Uranium | 184 | 92 |
| In Carbon | 12 | 6 |
| Outside Pile | 4 | 2 |
|  | 200 | 100 |

3. SUMMARY BY TYPE AND LOCALE

|  | M. e. v. per fission | Percent in U | Percent in C | Percent Outside |
| --- | --- | --- | --- | --- |
| Kinetic Energy of fission fragments | 159 | 100 |  |  |
| Kinetic Energy of neutrons | 7 |  | 90 | 10 |
| Gamma radiation from fission fragments and products | 5 | 70 | 25 | 5 |
| Beta radiation from fission fragments and products | 11 | 100 |  |  |
| Nuclear affinity of neutrons (gamma radiation) | 18 | 60 | 25 | 15 |

In order to control the temperature of the chain reaction and to prevent the accumulation of heat in the chain reaction pile, some suitable circulating system must be employed to convey the heat away from the pile when a large power output is desired. The design of this system within the pile proper and the type of coolant employed are critical factors which, if not properly taken into consideration, will make it impossible to design a pile capable of producing a self-sustaining chain reaction.

The problem of removing heat from a chain reacting system is complicated by various factors. The corrosive effect on uranium of most otherwise suitable circulating media is very troublesome. This factor is important primarily because of the presence in the system of high temperatures and intense neutron densities causing an acceleration of any normal rate of corrosion. One of the most serious results which may result from the corrosive action of a circulating medium on the uranium is the physical deterioration of the uranium in the system. It is essential, then, that the circulating medium be of such a character as not to destroy the uranium bodies in the system. Furthermore, many otherwise suitable cooling media absorb neutrons to such an extent that they cannot be used in the pile.

In the presently described system, helium is used as the circulating medium to remove heat from the structure. Helium is an inert gas and therefore the corrosion problem with respect to the uranium is eliminated. Furthermore, helium has practically no neutron absorption factor and is therefore very satisfactory from the point of view of its effect on the reproduction of neutrons in the chain reacting system. In other words the danger coefficient of helium is very low. The danger coefficient is defined in terms of the ratio of the weight of impurity in the chain reacting system per unit mass of uranium, and is based on the cross-section for absorption of thermal neutrons. It therefore can be allowed to diffuse throughout the pile and can be circulated therein in open channels without the use of tubes which might also absorb neutrons to the detriment of the chain reaction.

The fission products resulting from the chain reaction are, at least in general, highly radioactive. The diffusion of the fission fragments within the uranium is very slow, but fission fragments originating close to the surface of the uranium can escape into the helium gas, thereby causing the gas to become radioactive. This, of course, is objectionable because it complicates the shielding problem in the circulating system outside the pile and requires steps to be taken to protect persons in the vicinity of the gas ducts from the harmful effects produced by this radioactivity. It may therefore be desirable to cover or coat the uranium surfaces with metals such as aluminum or zinc, only a thin coating being required to prevent the flying fragments of the fissions from escaping from the solid uranium. This results in a substantial reduction in the radioactivity of the circulating helium gas, thus simplifying the protection problem outside of the pile.

In addition to the usual industrial hazards, personnel must be protected from injury by gamma rays and neutrons emanating from the reactor and the circulating gas and equipment, from injury by beta rays, or by close contact with radioactive materials, and from radioactive poisoning due to inhalation of radioactive gases emanating from the reactor.

As one of the principal objects of the present invention, we provide a self-sustaining chain reacting power plant operating by virtue of nuclear fission at high power output in which temperature of the system is effectively controlled by efficient removal of heat therefrom in an effective and safe manner at high power outputs of the power plant.

Other objects and advantages of our invention will become apparent from the following description and the drawings, which illustrate a power plant operating by virtue of nuclear fission in which the heat equivalent of 100,000 kilowatts is removed by circulation therethrough of 400,000 pounds of helium per hour.

Fig. 5 is a perspective view illustrating one arrangement for the graphite making up the lattice structure;

Fig. 6 is a plan view of a graphite brick shown in Fig. 5;

Fig. 7 is a horizontal sectional view taken on the line 7—7 of Fig. 6;

Fig. 8 is a transverse sectional view taken on the line 8—8 of Fig. 6;

Fig. 9 is a vertical sectional view through three bricks illustrating the manner in which bricks are doweled together;

Fig. 10 is an enlarged sectional view through one of the graphite uranium cartridges taken along the line 10—10 in Fig. 11;

Fig. 11 is a top plan view taken on the line 11—11 of Fig. 10;

Fig. 12 is a top plan view of an assembly of uranium plates which fit into the cartridges shown in Fig. 10 and is used at the center of the lattice structure where the heat is most intense;

Fig. 13 is an assembly of uranium plates corresponding to Fig. 12 but which is employed somewhat away from the center of the lattice structure where the heat generated is less intense;

Fig. 14 is an enlarged, detailed, vertical sectional view through a portion of the reactor on line 14—14 of Fig. 2 showing the relationship between the lattice structure, the internal shield for the reactor, and the guide tubes which extend from the graphite through the internal shield providing a passage for charging the uranium into the lattice;

Figure 1:
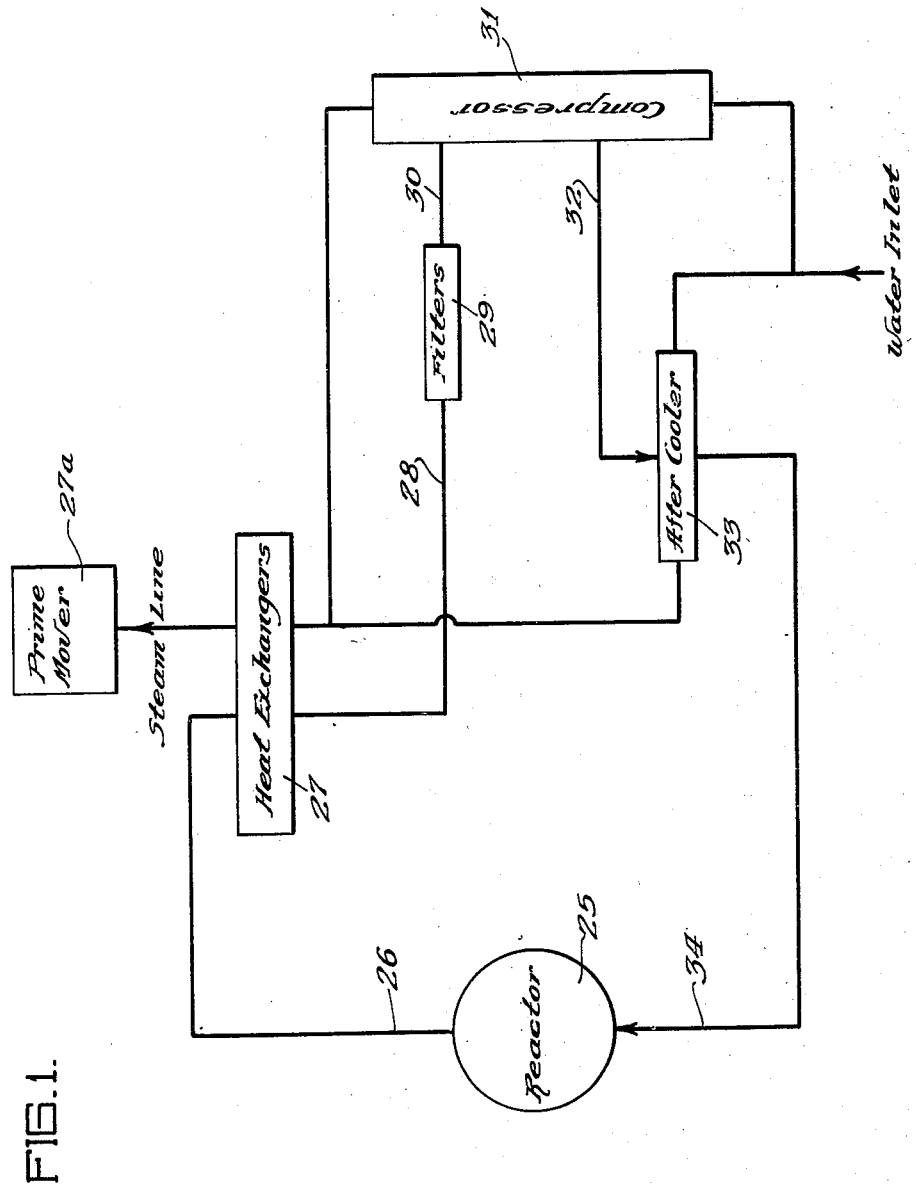
Fig. 1 is a diagrammatic view of the reactor and the heat extraction system.

Referring to Fig. 1, the neutron chain reaction is effected in a reactor diagrammatically shown at 25. The heat generated by virtue of the chain reaction is carried away by helium passing from the reactor through a pipe 26 into heat exchangers 27, which may be of any well known type to provide steam for the prime mover 27a. This steam may be used in any conventional manner to generate power as desired. The cooled helium then passes through pipe 28 into filters 29, which remove any solid matter from the helium, and thence into a battery of water cooled compressors 31 through a pipe 30. The compressors may be of the centrifugal or reciprocating type although the former is generally preferable. For most efficient heat removal, the helium in the reactor is maintained under pressure, and for that reason the compressors 31 serve to establish and maintain the pressure and also serve as pumps to circulate the helium. The high pressure gas leaves the compressors 31 through suitable piping 32, and the heat resulting from the compression is removed from the gas in after-coolers 33. From these coolers, the helium gas is returned to the reactor through piping 34. After-coolers 33 may be used to preheat water to be turned into steam in exchangers 27. Similarly, the jackets of the compressors 31 can be used to preheat the feed water for exchangers 27. During operation the heat exchangers may become more or less radioactive due to the radioactivity of the helium entering the exchanger. As a consequence cleaning of the exchanger may become difficult. In order to minimize the necessity for cleaning it is found desirable to use water treated for reduction of its scale forming and corrosive properties in the heat exchanger.

The pressure of the helium gas entering the reactor is 115 pounds per square inch and the temperature is 120 degrees Fahrenheit. About 400,000 pounds of gas are circulated through the reactor shown herein per hour. The gas leaves the reactor at a pressure of 103.6 pounds per square inch and at a temperature of 800 degrees Fahrenheit.

Figure 2:
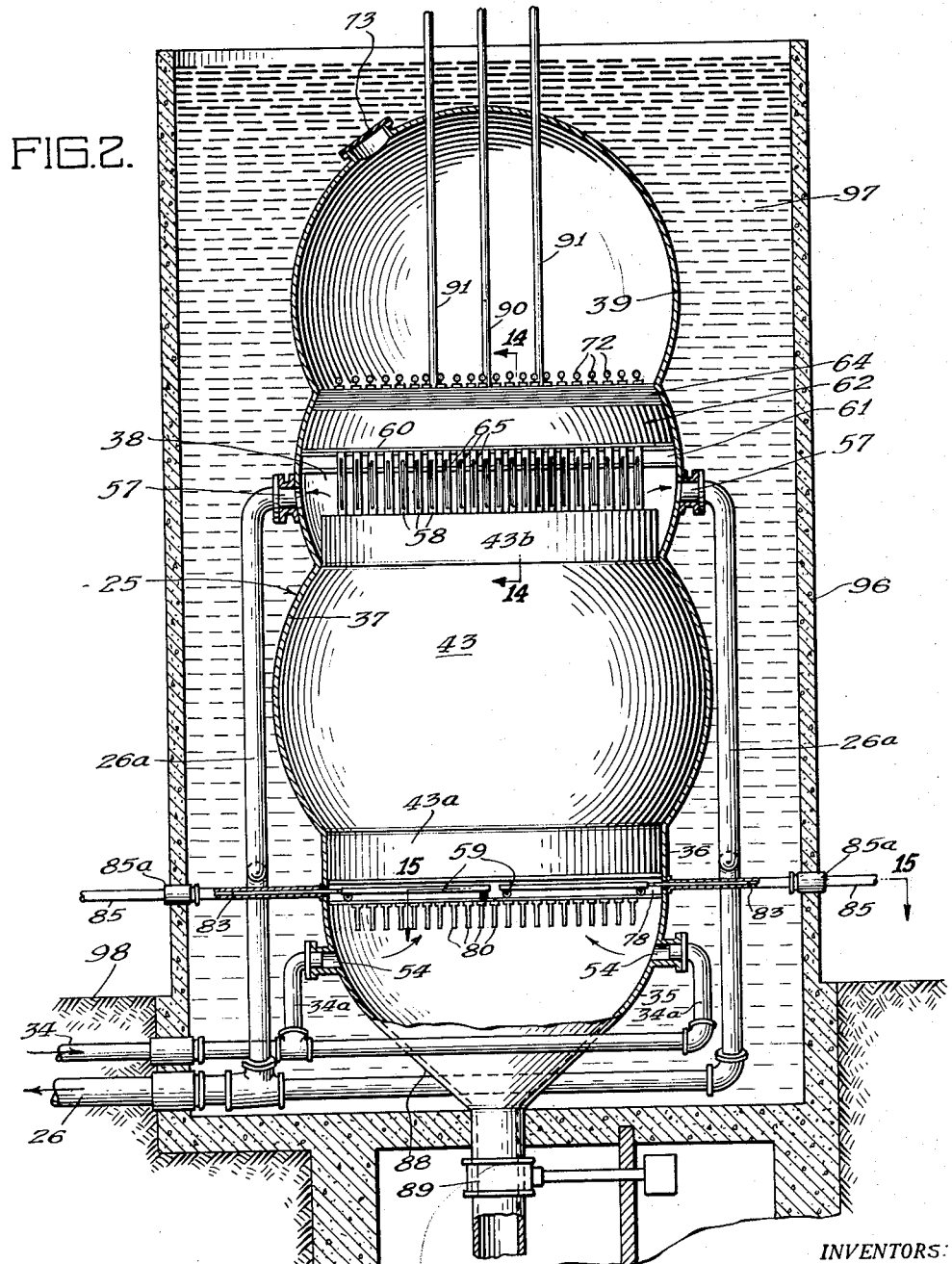
Fig. 2 is a vertical sectional view through the reactor showing in elevation the graphite and uranium lattice.

Referring to Fig. 2, the reactor 25 consists of a lower chamber 35, which serves as a gas inlet and uranium discharge chamber. Above the chamber 35 is a valve housing 36 which accommodates the uranium discharge valves presently to be described. The uranium-graphite lattice pile is contained in chamber 37, above which is a hot gas discharge chamber 38. A dome 39 completes the shell making up the reactor 25. These shell segments are welded together so as to form one integral shell, and, as noted, the various segments are of spherical shape so as to give added strength to withstand the relatively high pressures existing in the shell.

Figure 3:
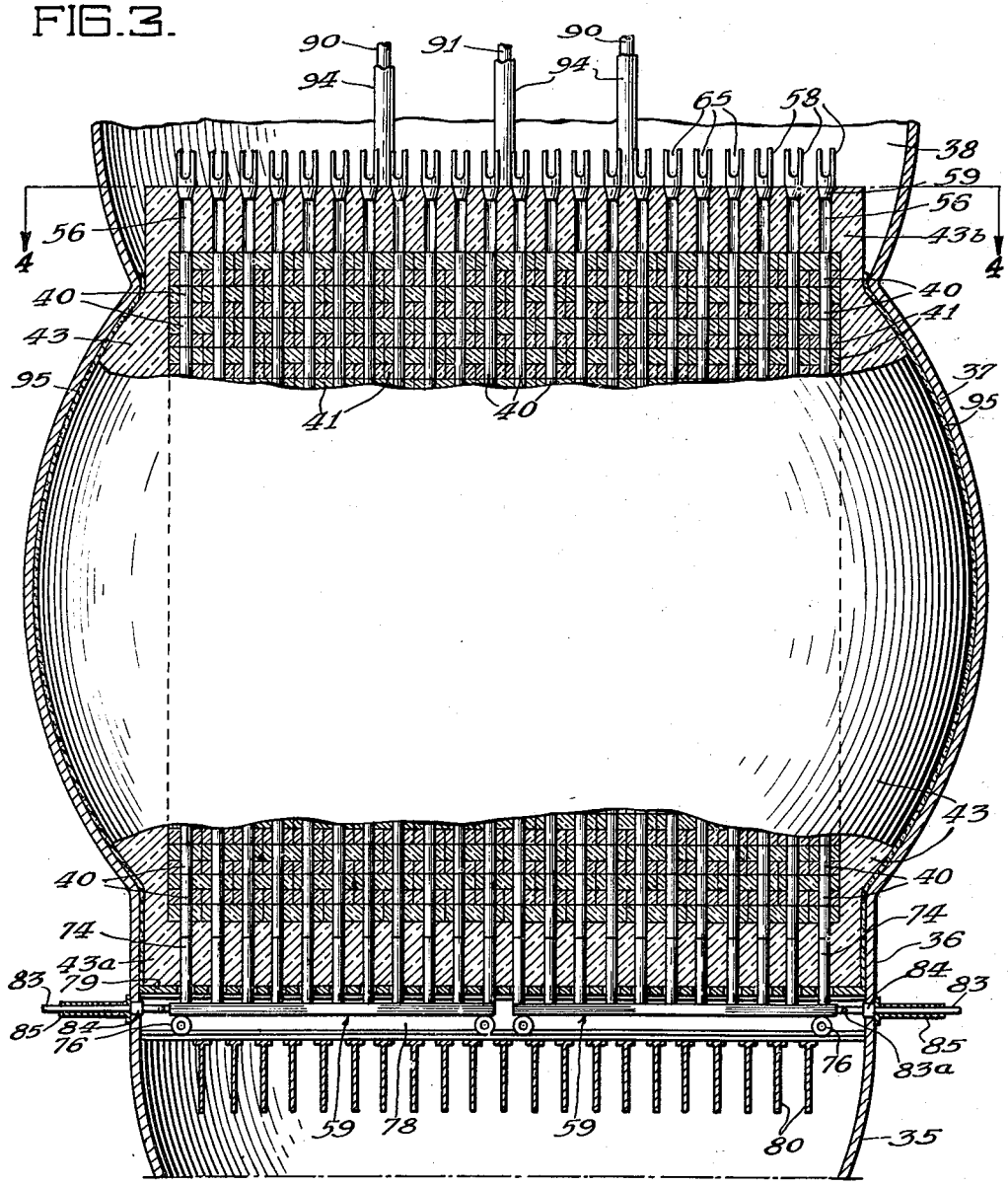
Fig. 3 is an enlarged, fragmentary, vertical sectional view through the center portion of the reactor shown in Fig. 2, indicating the relationship between the uranium and graphite and further illustrating the structure at the bottom and top of the lattice.

Referring to Fig. 3, the lattice structure comprises graphite cartridges 40 surrounded by graphite bricks 41. The cartridges contain uranium in the form of cylindrical aggregates or bodies 42 (see Figs. 10-13, inclusive). A high-grade AGOT graphite is preferably employed for the cartridges and the matrix of the lattice structure. Surrounding the lattice is dead graphite 43 (Fig. 3), which need not be as pure graphite as that employed in the lattice. AGX grade graphite is satisfactory for use in the dead graphite area.

Figure 4:
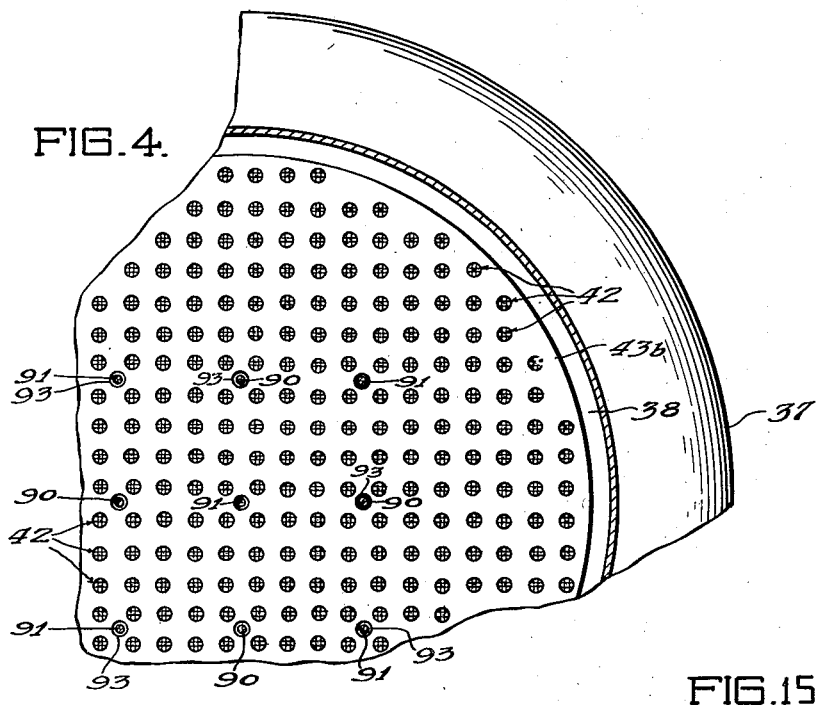
Fig. 4 is a fragmentary, horizontal sectional view taken through the lattice on line 4—4 of Fig. 3 showing slightly more than one quadrant only of the reactor.

The graphite cartridges 40 are arranged in vertically disposed columns extending from the bottom of the lattice to the top. The columns are disposed in parallel rows, as indicated in Fig. 4, so that the uranium in the graphite is arranged in a cubical lattice.

The graphite 41 may be in the form of bricks piled on top of each other, as shown in Fig. 5, doweled together by means of dowel rods 41a passing through holes 41b. As illustrated, the bricks are 22 inches long and have a cross section 11 inches by 5½ inches. Each brick finished but before drilling weighs 65.8 pounds. Each brick is drilled to provide holes 44 through which the graphite cartridges 40 will pass. As the lattice structure is being built, the graphite bricks 41 are piled up so that the holes 44 are in alignment to form a continuous vertical passage from the bottom to the top of the pile to accommodate each of the columns of graphite cartridges. Sufficient space is provided between adjacent bricks and between the cartridges and the bricks to permit expansion of the graphite.

Each of the graphite cartridges 40 (see Fig. 10) is provided with a longitudinal passage 45 extending throughout the entire height of the cartridge. Adjacent to the upper end of each cartridge is a cylindrical seat portion indicated at 47 provided with an annular shoulder 48 on which the uranium body 42 rests. Inasmuch as there is approximately only 50 percent free volume through the uranium bodies 42, the velocity of helium gas passing through the uranium is considerably greater than the velocity of the gas passing through the free passage in the graphite cartridges.

Most of the heat generated as a result of the neutron chain reaction is produced in the center portion of the lattice structure and progressively less heat is generated toward the outside of the structure. Because of this, it is desirable that a greater amount of helium gas pass through the central portion of the lattice structure than through the outside portions. A satisfactory way for controlling the flow of the helium gas through the passages in the graphite cartridges is to provide a throat or constriction 46 (see Fig. 10) in the outer cartridges to create greater resistance to the flow of the gas through these restricted passages. In this manner, by providing the narrowest throat or constriction 46 in the outermost cartridges and further by gradually increasing the diameter of this constriction in the passages toward the center of the lattice structure and finally providing no constriction in the center portion of the construction, it is possible to selectively control the amount of gas flow through the various locations in the lattice to most effectively remove heat from the system.

The average mass velocity of the helium passing through the ducts in the lattice is about 5.56 pounds per second per square foot, while the maximum is at the center of the lattice and is approximately 12.8 pounds per second per square foot. The average linear velocity of the gas in the duct is about 110 feet per second and the maximum at the center of the lattice is about 254 feet per second. The average mass velocity of the helium gas in the uranium elements 42 is 8.83 pounds per second per square foot, while the maximum is about 20.4 pounds per second per square foot. The average linear velocity of the gas in the elements is about 175 feet per second, while the maximum is 404 feet per second. On an average, about 1068 pounds of helium gas per hour pass through each column, the centermost columns conveying the most, the maximum for one column being approximately 2460 pounds per hour. The heat transfer coefficient for the average column is about 163 B. t. u.'s per hour per square foot per degree Fahrenheit, while the coefficient for the centermost columns is about 318 B. t. u.'s per hour per square foot per degree Fahrenheit. 400,000 pounds of helium are circulated per hour, removing the heat equivalent of 100,000 kilowatts from the reactor. The power required for circulating the helium and running the auxiliaries of the plant is about 12,000 kilowatts, leaving a net power of around 88,000 kilowatts available to form steam for external use.

The uranium bodies 42 are each made up of a plurality of parallel plates 49 disposed vertically and spaced apart with lugs 50 serving as spacers between the adjacent plates. In this manner, a plurality of vertical passages 51 and 52 are provided between the plates. The uranium disposed in plate form as illustrated is thus provided with a relatively large amount of surface for cooling. The size of each uranium cylinder is about 3⅝ inches by 3⅝ inches, having approximately 50 percent free volume, and each weighs about 13.4 pounds. This weight represents the value for uranium metal cylinders. If uranium carbide is used, the weight of each cylinder is about 14.9 pounds. The overall mass ratio of graphite to uranium in the lattice is 5.4. The overall lattice structure is in the form of a cylinder 28 feet in diameter and 26 feet high and has a two foot layer of dead graphite at the top and a layer on the sides varying in thickness from 1 foot to 4 feet. These figures represent an operative lattice, but, of course, the invention is not intended to be limited to this specific example.

As shown in Fig. 3, a space is left between the dead graphite layer 43 and the shell of the reactor and this space is filled with shredded asbestos indicated at 95 to a thickness of about one inch. The graphite will expand and contract as a result of the heat generated in the lattice and for this reason the space must be provided. The asbestos layer will compress to permit this expansion but will serve to prevent leakage of helium gas through this space so that the gas cannot by-pass the lattice.

The inside surfaces of the reactor shell may be coated with some suitable material to prevent corrosion of the metal.

As pointed out above, most of the heat generated by the chain reaction is generated in the uranium and is produced toward the center of the lattice, and consequently in this region a greater amount of surface exposed to the circulating medium should be provided on or adjacent to the uranium and particularly in the central area of the reactor than elsewhere than in the region in the structure. This is effected, as illustrated in Fig. 12, passing the coolant in direct contact with the uranium bodies and by decreasing the thickness of the uranium plates 49, thereby providing a larger number of plates with a greater number of passages between them. An intermediate condition will exist in the lattice structure in positions between the center and the top or the bottom. Thus, for these intermediate positions, uranium plates illustrated in Fig. 13 are employed wherein the thickness of the metal is greater than that illustrated in Fig. 12 but not as great as that shown in Fig 11, so that the amount of cooling surface provided is somewhere between that shown in Figs. 11 and 12.

With the uranium 42 arranged in the form of vertically disposed plates 49 in the upper portion of the vertical passage 45 it is seen that a continuous passage through the graphite and the uranium is provided throughout the entire length of each of the cartridges 40. As shown in Fig. 10, each of the cartridges is chamfered, as indicated at 53, so as to facilitate the insertion of the cartridges into the openings 44 in the bricks.

The lattice structure filled to capacity usually contains about 12,000 uranium elements.

Referring again to Fig. 2, the helium gas enters the reactor from the pipe 34 (Fig. 1) through intake nozzles 54, passes upwardly in the direction of the arrows through vertical passages in the lower layer 43a of dead graphite (Fig. 3) and then continues upwardly through the passages 45 in the graphite cartridges 40 (Figs. 3 and 10) throughout the entire height of the lattice, and finally through passages 56 in the upper layer 43b of the dead graphite into discharge chamber 38. The hot gas leaves the reactor from the discharge chamber 38 through discharge nozzles 57. From the reactor, as previously explained, the helium gas passes through the cooling circuit shown in Fig. 1.

At the top of the graphite 43 over each column of graphite cartridges 40 is a guide pipe 58 (Figs. 2, 3, and 14) socketed at its lower end in the graphite at 59.

The top of the gas discharge chamber 38 is bounded by a steel floor 60 (Fig. 14) supported on a plurality of I-beams 61, which, in turn, are carried by the steel shell. Above the floor 60 is an internal neutron and gamma ray shield, generally indicated at 62, consisting of a 3 foot layer of graphite 63 and a layer of steel plates 64. The lowermost steel plate 64a is one inch thick, and the next plate 64b is a one inch steel plate with about 2 percent to 10 percent boron in the metal. The next 14 plates are of mild steel or cast iron, and each plate is about one inch thick.

The guide tubes 58 extend upwardly through the hot gas chamber 38 and through the graphite layer 63 and steel layer 64 making up the internal shield 62, and terminate at the top of the steel layer 64. Slots 65 are provided in the guide tubes 58 throughout substantially the height of the hot gas chamber 38 through which helium gas passing up through the lattice is discharged. At the top of the guide tubes 58 is a steel and graphite plug 66 consisting of a steel layer 66a corresponding in thickness to the thickness of the steel layer 64 of the internal shield and a graphite layer 66b corresponding in thickness to the graphite layer 63 of the internal shield. A threaded rod 67 passes through the longitudinal center of the graphite portion 66b of the plug and is threaded into the steel portion 66a, as indicated at 68. A suitable nut 69 is threaded onto the lower end of the rod 67 and a washer 70 is disposed between the nut 69 and the graphite 66b engaging the lower face of the graphite portion 66b of the plug. When the rod is drawn up tight into the steel portion 66a of the plug, the assembly becomes rigid. The plug is provided with a flange 71 which rests on the upper surface of the internal radiation shield 62, and a screw eye 72 is threaded into the top of the plug, providing means for grasping the plug for withdrawal and insertion into the shield.

The dome 39 encloses a chamber above the steel and graphite plug 62. A covered manhole opening 73 is provided in the dome 39 for admitting persons in and out of this chamber for loading uranium into the lattice. As previously explained, the uranium is mounted in the graphite cartridges 40 (Fig. 10) and the loaded cartridges are lowered through the guide tubes 58 into the vertical passages 56 in the upper layer 43b of the dead graphite, and finally down into the lattice structure. In order to prevent establishment of a substantial concentration of radioactive material in the dome it is found desirable to establish a helium pressure within the chamber somewhat higher than that in adjoining chambers thereby preventing or at least minimizing diffusion of radioactive gases into the dome.

At the bottom of the lattice, each of the columns of graphite cartridges 40 is supported on a dead graphite cylinder 74 (see Fig. 3) of AGX grade graphite through which is a vertical passage for conveying the helium gas into the passages 45 through the graphite cartridges 40. The graphite cylinders, in turn, are supported on dump valves generally indicated in Fig. 2 at 59. There is a plurality of such valves for discharging the uranium from the lattice.

During the operation of the present device, the transsuranic element 94 is produced, together with radioactive fission products. After long periods of operation, the fission products may so poison the materials in the device by neutron absorption as to lower the reproduction ratio of the system. In order to perpetuate the chain reaction, it is essential that the value of the reproduction ratio remain above unity. Thus it may be desirable to remove the fission products from the lattice from time to time. This is done by removing the uranium from the lattice and replacing it with fresh material. The radioactive fission products and element 94 can then be separated from the uranium by extraction methods. The radioactive fission products are useful in medicine and as radiation sources, and element 94, being fissionable in a manner similar to $U^{235}$, may be used to enrich natural uranium to increase its efficiency in chain reacting systems, for example. The separation processes form no part of the present invention, so that no purpose will be served in describing herein the details thereof.

Dump valves 59 are especially useful in case of extreme emergency to prevent the reactor from being destroyed in case of failure of the control and safety rods to effectively limit the chain reaction to safe values. All or part of the uranium bodies can be dumped rapidly into chamber 35, destroying the geometrical arrangement of the uranium bodies in the graphite and thus preventing the maintenance of the chain reaction. Such procedure is only resorted to after failure of the control and safety rods to act. The dumping may be manual and/or automatic upon rise of the neutron density in the system to a dangerous level, as will be brought out later.

Figure 18:
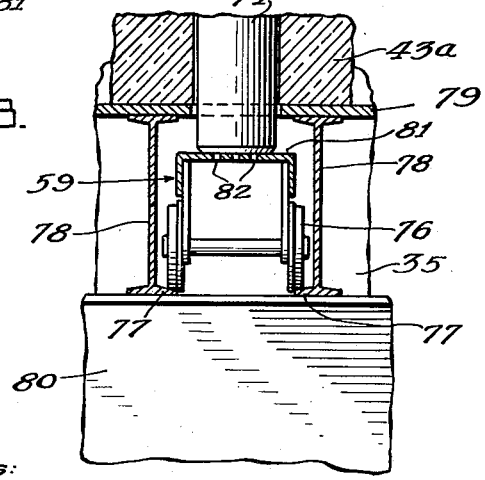
Fig. 18 is a vertical sectional view through one of the valves on line 18—18 of Fig. 16 showing the relationship of the valve to the lattice and the lattice support.

Each dump valve 59 in effect is a flat car mounted on wheels 76, operating on the bases 77 of adjoining I-beams 78, the bases serving as rails. The I-beams 78 are spaced apart, as best shown in Fig. 18, and on their upper flanges support a floor 79 on which is mounted the dead graphite 43a (see Fig. 3). The I-beams 78, in turn, are supported on T-beams 80, which are carried by the reactor shell.

Figure 16:
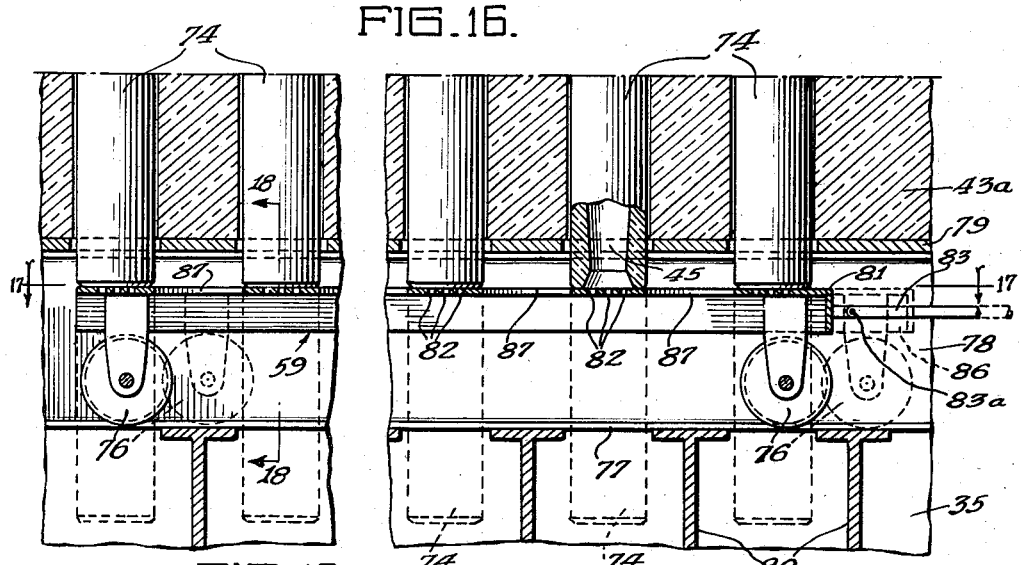
Fig. 16 is an enlarged, vertical sectional view through one of the discharge valves on the line 16—16 of Fig. 15 showing the relationship of the valve to the lattice structure.
Figure 17:
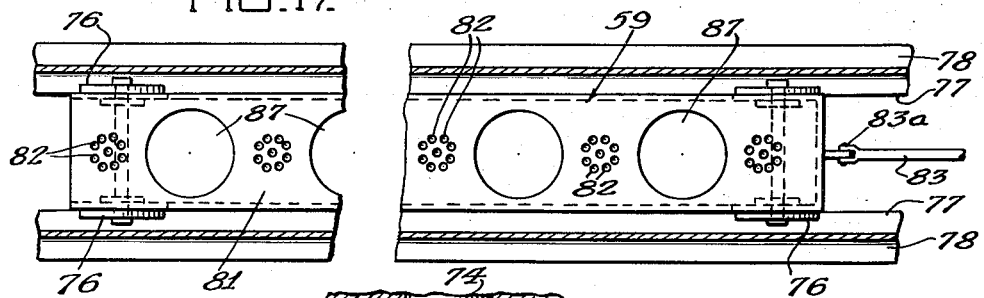
Fig. 17 is a horizontal sectional view taken on the line 17—17 of Fig. 16.

Referring to Figs. 16-18, inclusive, each dead graphite cylinder 74 supporting a column of uranium cartridges 40 rests on the top 81 of the dump valves or cars 59 directly over a plurality of perforations 82 through the top 81 of the cars 59, the perforations 82 being in alignment with the vertical passages through the dead graphite cylinders 74 and the passages 45 through the column of graphite cartridges 40. Thus, with the dump valve or car 59 disposed in the solid line position shown in Fig. 16, helium gas passes upwardly from the inlet chamber 35 between the T-beams 80 and I-beams 78 through the perforations 82 in the top 81 of the valve cars, and then through the vertical passages leading through the lattice structure.

Figure 15:
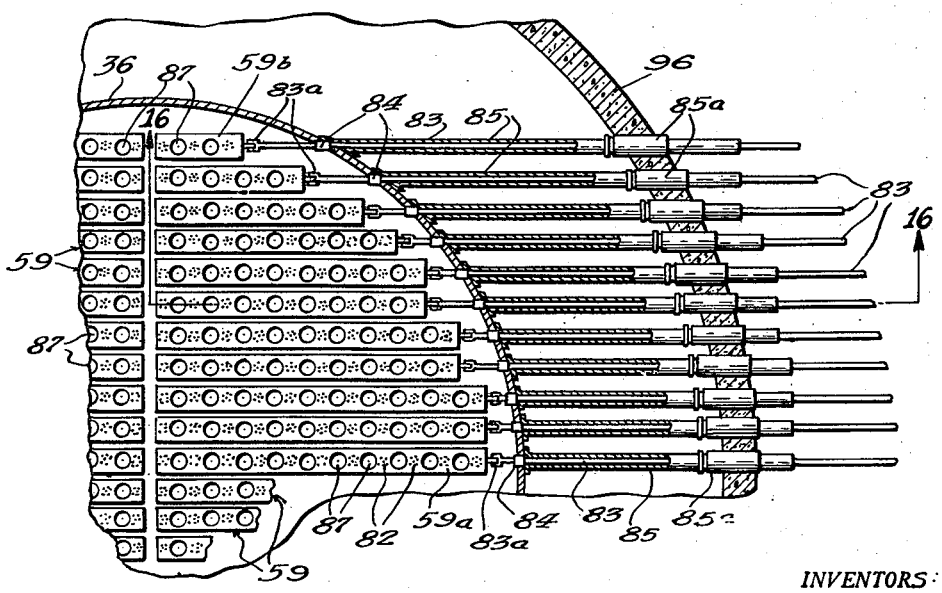
Fig. 15 is a fragmentary, horizontal sectional view taken through the lower part of the reactor along line 15—15 of Fig. 2 showing the arrangement of the valves used in discharging the uranium from the lattice structure.

The dump valves or cars 59 vary in length, depending upon their position in the lattice, as shown in Fig. 15, the centermost car 59a being adapted to support 10 columns of cartridges, whereas the outermost car, shown at 59b, supports only two columns.

As illustrated in Fig. 15, the cross section of the reactor, insofar as the dmp valves are concerned, is divided into four quadrants, each quadrant being provided with 11 dump valves or cars and being served entirely independently of the other quadrants of the reactor. One quadrant only is completely shown in Fig. 15, though each of the other three quadrants is an exact duplicate of the one illustrated, except that in the left hand half of the reactor shown in Fig. 15, the dump valves or cars operate in the opposite direction from that shown for the right hand half of the reactor.

Extending horizontally from the front of each of the dump valves or cars 59 is a dump rod 83 suitably fastened to the car as shown at 83a in Figs. 16 and 17. The dump rods 83 project through the shell of the reactor, as shown in Fig. 15, and extend horizontally to a valve control position (not shown) outside the reactor shell. Stuffing boxes, generally indicated at 84 in Fig. 15, are provided around each of the dump rods 83 where the rod passes through the shell of the reactor to prevent escape of gases from inside the reactor shell. The dump rods 83 are slidable in guide tubes 85. Stuffing boxes 85a surround the guide tubes 85 where they pass through the concrete wall 96. The guide tubes may be provided with suitable means (not shown) for absorbing or obstructing the path of neutron and gamma radiation therethrough as will be understood by those skilled in the art.

When dumping or discharging the uranium from the lattice structure for purposes of treating the uranium, all of the columns of uranium loaded graphite cartridges 40 supported on a single dump valve car are dumped or discharged simultaneously. In other words, referring to Fig. 15, all 10 columns of uranium loaded graphite cartridges supported on the dump valve car 59a are discharged simultaneously. This is done by moving the car to the dotted line position 86 (see Fig. 16) wherein large circular openings 87, shown in Figs. 16 and 17, become disposed directly under the dead graphite cylinders 74, thereby permitting the dead graphite cylinders 74 and the column of uranium loaded graphite cartridges 40 supported thereon to discharge through the openings 87 in the dump valve car. The graphite and uranium thus discharged passes down into a downwardly extending chute 88 shown in Fig. 2, and accumulates at a gate valve 89. Upon opening of this gate valve 89, the uranium and graphite thus discharged can be passed into a suitable car or container.

A self-maintaining chain reaction, once started, must be controlled, for otherwise the neutron density may increase so rapidly that the reaction will reach violent proportions. The rate of heat generation in the lattice may exceed the rate of heat removal by the heat extraction system so that the temperature in the reactor will rise beyond a safet limit, even to the point of causing the uranium to melt with resulting break-down of the lattice structure.

Referring to Figs 2, 3, and 4, four control rods 90 and five safety rods 91 pass vertically into the lattice through vertical openings 93 in the graphite 41 between the cylinders of uranium 42. These rods extend about two-thirds of the vertical distance through the lattice and serve to absorb neutrons so as to stabilize or stop the chain reaction.

The safety rods 91 are movable vertically in the lattice but are to be disposed either in their lowermost position in the lattice or in their outermost position, the latter position being assumed when the chain reaction is in effect. The safety rods are lowered into the lattice only in the event of emergency or when the operation of the reactor is to be entirely stopped for any reason.

The control rods 90 also are movable vertically in the lattice but their positions will vary, their function being to stabilize the chain reaction and, with the help of the helium gas, to maintain a constant temperature in the lattice of about 800° F. as the maximum.

All of the rods 90 and 91 may be controlled automatically, as will be explained later, or manually. Though nine rods in all are shown more or less rods may be used if desired.

Figure 23:
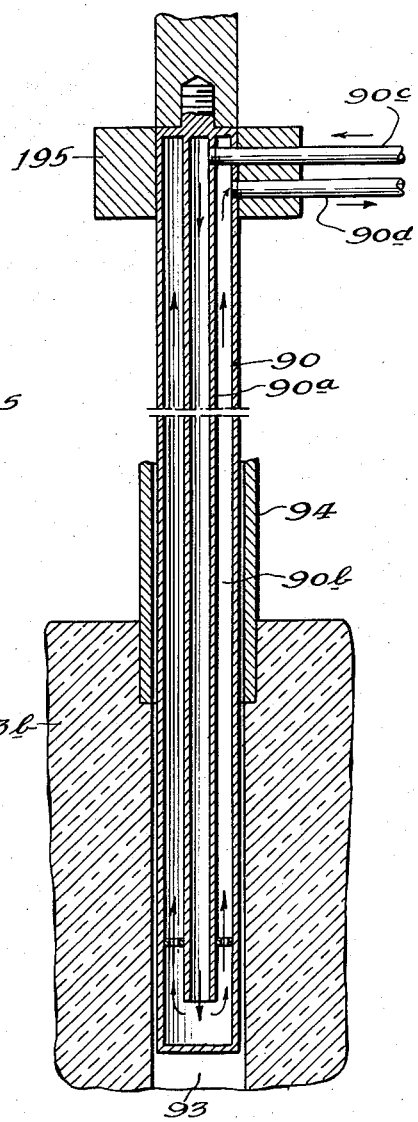
Fig. 23 is an enlarged, fragmentary detail sectional view showing a water cooled control rod.

The absorption of the neutrons by the control rods 90 is accompanied by considerable heat. Referring to Fig. 23, each control rod 90 may be in the form of a hollow tube closed at its lower end and surrounding an inner hollow tube 90a. The outer and inner tubes are spaced apart to form an annular passage 90b. Cooling water may thus be circulated through the control rod 90 entering the rod through a flexible tube 90c which conveys the water to the inside passage through the inner tube 90a, the water flowing downwardly through this tube to the bottom of the outer tube and then upwardly through the outer passage 90b finally leaving the rod through a second flexible tube 90d. The water may then be conveyed externally of the pile through a suitable cooling circuit (not shown) and then may be returned to the inlet tube 90c.

Extending above the lattice and surrounding each of the rods 90 and 91 is a guide pipe 94 (Fig. 3) to guide the movement of its corresponding rod. These pipes also may be provided with suitable means (not shown) for preventing escape of radiations from the reactor.

Referring to Figs. 2 and 15, a concrete shield 96 completely surrounds the reactor and extends vertically throughout the entire height of the reactor, terminating approximately eight feet above the top of the reactor dome 39. The concrete shield is cylindrical in cross section and is spaced a minimum distance of ten feet from the nearest point on the reactor shell. This concrete shield 96 is filled with water, shown at 97 in Fig. 2.

Extending downwardly from the discharge nozzles 57 are discharge pipes 26a which are enclosed within the concrete shield 96 and are disposed as closely as possible to the reactor shell so that there is a substantial thickness of water between the discharge pipes 26a and the concrete wall 96. These discharge pipes extend down to the bottom of the concrete shield to a position below the level of the ground indicated at 98, and are connected to the main discharge header 26, which likewise is disposed below the ground level.

Similarly, the gas intake header 34 (Fig. 2) is disposed below the level of the ground and passes through the concrete wall 96 of the shield entering the reactor through branch headers 34a, which are completely submerged in the water shield.

The construction of the lattice is commenced with the excavation for the foundations for the reactor shell proper and for the concrete structure or shield containing the water in which the reactor is immersed. The reactor shell itself, with its underground connections, dump valves, and graphite supporting beams is then built up to the level of the upper or internal radiation shield 62, and any necessary elevators and temporary super-structure required is erected. The graphite bricks 41, which have previously been machined and bored, are then laid, doweling them together and taking particular care to keep the brick surfaces perfectly true and clean. When all the graphite bricks are laid, a temporary platform is laid over the top of the graphite bricks, the platform being provided with a hole directly over the location of each of the graphite cartridges. With a special reaming tool, each hole through the graphite is properly gauged throughout its length to detect the presence of any shoulders or projections, and such projections and shoulders are removed with the reaming tool. Following this operation, the temporary platform is removed and the beams 61 for supporting the upper or internal graphite shield 62 are placed into position. The upper shield 62 is then built up of AGX or AGR graphite to its final thickness of about three feet. The beams for supporting the steel plates are then laid and the 16 one-inch plates making up the steel portion 64 of the shield are laid on top of the beams. The guide pipes 58 are then inserted in place and suitable thermocouples (not shown) for measurement of temperature within the reactor adjacent the point at which the cooling fluid is removed, installed on them. The steel and graphite plugs 66 are then inserted and the control and safety rod guides installed. The piping for the helium gas is then installed and fitted to the reactor shell and then the concrete shield 96 is poured. The mechanisms for operating the control and safety rods are finally installed in their proper place, and the entire unit is then in condition for operation except for the loading of the uranium.

From within the dome 39 of the reactor shell the graphite cartridges 40 loaded with the uranium plates 42 are lowered into the openings in the graphite. Several cartridges arranged in a column may be lowered into place at a time.

During the loading of the uranium, both the control rods and the safety rods 90 and 91 respectively are disposed in their innermost position in the lattice. As the charging of the uranium approaches the quantity necessary to produce an operating lattice, the loading operation will be suspended long enough for trial runs to be made. During the trial runs, the safety rods are moved to their outermost positions and the control rods are moved to various positions. Readings of the neutron density are made by the use of indium foils inserted in suitable testing slots in the lattice. The indium foil is inserted in the lattice and left there for a predetermined period of time, during which the foil is subjected to neutron bombardment. Then by suitable Geiger-Müller counters, the beta radiations from the indium foil radioactivity created by the neutron bombardment are counted. When it is found by this experimental means that the quantity of uranium in the lattice will support a chain reaction at the highest temperatures contemplated, the loading of the uranium is discontinued. All empty portions of the columns are then filled with dead graphite so as to complete the lattice structure. The ratio of graphite to carbon and the size of the uranium plates may be determined in accordance with the principles discussed in copending application of Fermi and Szilard, Serial No. 568,904, filed December 19, 1944, now Patent No. 2,708,656.

The power plant above described is ideally adapted for automatic control to maintain the neutron density within the reactor substantially constant at a predetermined level, and thus give a substantially constant power output. Due to the fact that large masses of materials are utilized in the reacting portion of the structure, there is a temperature lag therein. Consequently, it is convenient to monitor and control the reaction by means of ionization chambers which will measure the neutron density at the periphery of the lattice portion of the structure. As the rate of neutron diffusion out of a chain reacting system is always proportional to the rate of generation of neutrons within the structure, the ionization chambers can readily be placed at the periphery of the pile or lattice, and in fact are preferably so positioned in order that they be not subjected to the extremely high neutron densities existing within the lattice.

Before proceeding to a description of one type of control system that may be utilized, it is desirable to point out the manner in which the control rods operate to regulate the neutron density. In any self-sustaining chain reacting structure adapted to produce power, the neutron multiplication ratio of the system must be greater than unity. For any value over unity, by an amount sufficient to overcome impurity losses in the system, the chain reaction becomes self-sustaining and the neutron density without control will increase exponentially in point of time, until the device is destroyed. For proper control, the system must be held in balance by maintaining the chain reaction at some point where the production of new neutrons is balanced with the neutrons initiating the chain. Under these conditions, the reacting portion of the structure will continue to maintain the neutron density therein which obtained when the system was balanced.

However, in order to enable the reactor to reach a desired neutron density, the system must be permitted, for a period of time, to rise in neutron density until the desired density is reached. After the desired density has been reached, it is necessary thereafter to hold the system in balance.

Inasmuch as the reproduction ratio of the lattice structure is reduced by the presence of neutron absorbing impurities, such impurities can be introduced in the lattice in the form of the control rod which can be of a material such as boron or cadmium, which will absorb large amounts of neutrons. The depth to which this control rod penetrates into the lattice will determine the reproduction ratio of the lattice and a range can be obtained between a condition providing a neutron reproduction ratio which is greater than unity and a condition at which no chain reaction can be maintained. The exponential rise of neutron density can be made relatively fast or relatively slow in accordance with whether the multiplication ratio is permitted to be much greater than one, or only slightly greater than one. There is a small percentage of delayed neutrons emitted in the fission process. These delayed neutrons cause the neutron density to rise in an appreciable time rather than almost instantaneously. The time for doubling the neutron density increases as the multiplication ratio approaches unity, and by adjustment of the control rods any desired rate of rise can be obtained up to the maximum corresponding to the reproduction ratio characteristic of the given structure when all control and safety rods are removed.

The broad method of control preferred is to withdraw all safety and control rods from the structure to a point where there is an exponential, and preferably slow, rise in neutron density within the structure. When a desired neutron density has been reached, the control rod is then returned into the pile to a point where the reaction is balanced. This balance is then maintained to maintain a constant power output in the reactor. The maintenance of the balance point with the control rod would be relatively simple were it not for the fact that changes in temperature change the reproduction ratio of the structure slightly, and in any chain reacting structure where there is any variation of pressure of the circulating medium for example, or in atmospheric pressure in case of a structure exposed to the atmosphere, the reproduction ratio of the system will slightly change. It is desirable, therefore, that the control rods be so manipulated that they maintain a constant neutron density within the system. Such a method of control may be accomplished by automatic connection of the control rods with an ionization chamber measuring neutron density, positioned within the reactor close to the lattice.

Furthermore, due to the exponential rise of neutron density within the reacting structure when the multiplication ratio is greater than unity, all possible precautions must be taken to prevent a continued exponential rise in neutron density in case of failure of the control rod to return to the balance position. It is for this reason that safety rods are provided. In case the neutron density has risen to a very large figure before the safety rods operate, it might then be impossible for the safety rods to absorb a sufficient number of neutrons to reduce a dangerously high neutron density to safe limits in a sufficiently short period of time. Under these circumstances, there is no alternative but to dump the uranium bodies and thus destroy the lattice arrangement by which the self-sustaining chain reaction is made possible.

While there are many means by which the control rods, the safety rods, and the dumping can be operated, it is believed that by the illustration and description of one simplified circuit, other and fully equivalent circuits will be made apparent to those skilled in the art.

Figure 19:
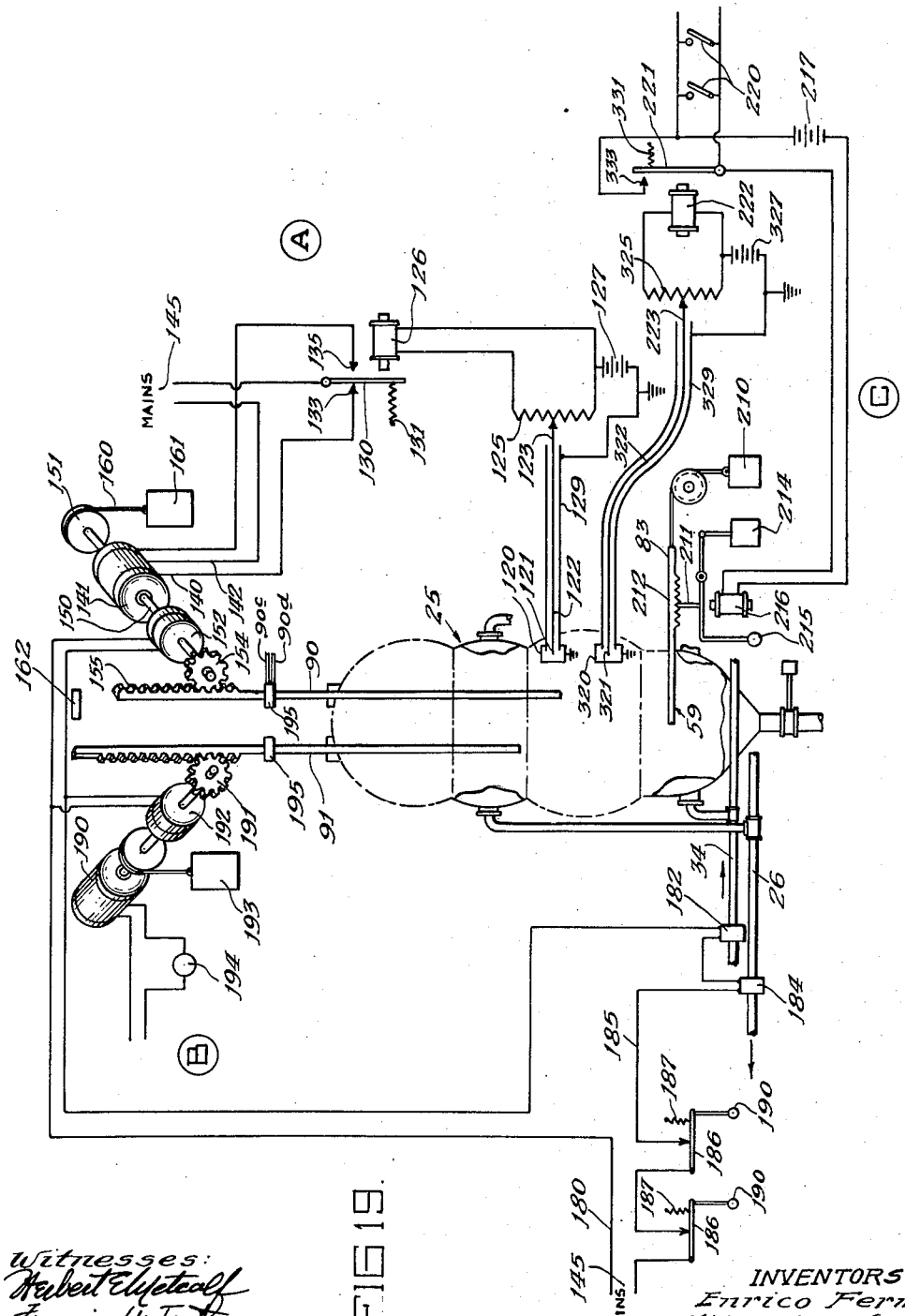
Fig. 19 is a diagrammatic view showing the control system for the power plant, the electrical circuit being reduced to the lowest terms.

Referring therefore to Fig. 19, which shows diagrammatically and reduced to lowest terms one form of control circuit that may be used for regulating the output of the power plant hereinbefore described, and referring first to control circuit A, a control ionization chamber 120 is placed within the reacting structure adjacent to the periphery of the lattice and filled with boron fluoride. A central electrode 121 is provided within the chamber 120 and connected to wire 122 leading outside of the reactor to a movable contact 123 on a resistor 125. Resistor 125 is connected across a relay coil 126. One side of relay coil 126 is connected to battery 127, the other end of which is connected to shield 129 around wire 122. Shield 129 is grounded, as is chamber 120. Alpha ray ionization due to neutron reaction with the boron within chamber 120 is proportional to the neutron density. Usual auxiliaries such as current amplifiers, supplemented relays etc. may be employed if desired in order to increase the sensitivity of the device. Thus the current in resistor 125 is varied in accordance with neutron density reaching the ionization chamber. Relay coil 126 operates a relay armature 130, which is spring biased by spring 131 to contact one motor contact 133, and is urged by current in coil 126 to contact a second motor contact 135. Contacts 133 and 135 connect to the outside of split winding 140 of motor 141, the center connection 142 of which is connected through power mains 145 to armature 130. Motor 141 operates shaft 150, having on one side thereof a pulley 151, the other end thereof being connected through a magnetic clutch 152 to a control rod gear 154. Control rod gear 154 meshes with a rack 155 on a control rod 90. Pulley 151 has a cable 160 wound thereon connected to a counter weight 161 so that the weight of the control rod is substantially balanced by counter weight 161, thus permitting motor 141 to run easily in either direction. As several control rods are to be utilized to control the pile, it is preferable that each rod be controlled by a separate ionization chamber and that the chambers be distributed around the periphery of the lattice.

Having described a circuit for controlling the position of a control rod, we shall now describe its operation, considering the safety rods withdrawn. Slider 123 on resistor 125, having previously been calibrated in terms of neutron density, is moved to the density position at which it is desired the reactor to operate, taking into account the difference in neutron density at the center of the lattice and at the periphery thereof during operation. This difference is a constant ratio at various operating densities. The reactor having at rest a neutron density much lower than the desired density at which relay coil 126 will receive enough current to operate armature 130, very little ionization takes place in ionization chamber 120, thus causing armature 130 to rest against contact 133. Motor 141 is thus energized to withdraw the control rod from the reactor to a point as determined by a limit stop 162, where the multiplication ratio of the reactor is just sufficiently greater than unity to permit an exponential rise in neutron density with the reactor. The motor 141 will stall at stop 162, and should be of a type permitting stalling for the required time. The reaction at this position of the control rod becomes self-sustaining and the neutron density rises. In consequence, the ionization within chamber 120 rises. As the ionization in chamber 120 increases, more and more current passes through relay coil 126 until the desired value has been reached. Relay coil 126 then operates to cause armature 130 to connect with contact 135, thus reversing the motor 141 to drive the control rod into the reactor to a point where the neutron density starts to decay. The control rod 90 will thereafter hunt between a point above the balance position where the neutron density rises and a point below the balance position where the neutron density decays, providing an average neutron density within the reactor as determined by the setting of slider 123 on resistor 125. As the mass of the reactor causes any temperature change to lag behind any neutron density change, the temperature of the reactor is maintained substantially constant. If desired, any of the well known anti-hunting circuits may be utilized, as will be apparent to those skilled in the art.

The main purpose of the control circuit A is to regulate the control rods to substantially balance the neutron density to produce any desired average temperature within the reactor.

Due to the fact that it might be possible for the control system as described to fail and thereby leave the control rods in a position where the neutron density would continue to rise indefinitely, both the safety rods 91 and the control rods 90 are preferably to be operated so as to enter the pile immediately upon any failure of the control rod system. One such emergency circuit for operating the rods is illustrated in circuit B. The circuit for each of the safety rods is the same.

The circuit B comprises a connection to main power line 145, one side of which leads through wire 180 to the magnetic clutch 152 on the control rod drive. Wire 180, after passing through clutch 152, passes in series through a pressure switch 182 in the helium input pipe 34 and then in a series with a thermostat 184 in the helium output pipe 26. Return wire 185 from the thermostat 184 then passes through a series of emergency switches 186, each of which being held closed by springs 187, and opened by manual operating handles 190. Thus, magnetic clutch 152 on the control rod motor shaft is in series with the power mains, the helium output temperature thermostat 184, the helium input pressure switch 182, and the emergency switches 186. The opening of any one of the switches will thus de-energize clutch 152 to remove the urge of the counter-weight from the control rods. The control rods will fall by gravity into the reactor. Furthermore, any failure of power in supply line 145 will also de-energize clutch 152 and permit the control rod to fall into the pile.

Each safety rod 91 may be raised out of the pile by safety rod motor 190 driving safety rod gear 191 through safety rod magnetic clutch 192, the safety rod being provided with a balancing counter weight 193 similar to that used on the control rod. Motor 190 is hand controlled by switch 194. Safety rod magnetic clutch 192 is connected in parallel with control rod magnetic clutch 152. Thus, upon any failure of power in the mains or the opening of any of the switches 182, 184, or 186, all of the rods will be relieved of their counter weights and will fall into the pile by gravity. Stops 195 may be provided on the safety rods, and any suitable braking action used to reduce the impact shock on the reactor.

However, in an abundance of caution, it is arranged that in case of failure of both the control and emergency circuits just described to stop the chain reaction, a portion of the lattice structure may be dumped by the use of circuit C. Dump valves 59 can be used for this purpose by connecting one or more of the dump valve rods 83 to a dump counter weight 210 urging the dump valve to open position. The dump valve is maintained closed by a dump valve latch 211 held in engagement with rack 212 on the dump valve rod 83 by latch counter weight 214. Latch 211 may be withdrawn manually by means of handle 215, or electrically by means of coil 216, which is energized by a battery 217, which preferably is separate and apart from power line 145. The circuit for coil 216 may be closed in two ways, either by hand switches 220 or by relay armature 221 moved by a relay coil 222 controlled by an emergency circuit identical in all respects with the ionization chamber control circuit previously described for circuit A. The individual portions of this circuit will therefore be numbered with numbers plus 200 corresponding to those used in circuit A, previously described.

The emergency ionization circuit is set by means of slider 223 to respond to a neutron density approaching the danger limit of the structure. Thus, in case the neutron density approaches the danger limit, the relay operates and portions of the lattice are automatically dumped. In case of failure of the automatic circuit to dump, the hand switches can be utilized; and, in case of failure of the hand switches, the handle 215 may be operated to dump the system. Obviously, such dumping is resorted to only in extreme emergency.

To place the system in operation, it is first tested under 150 pounds air pressure and examined for leaks, using the soap and water method. Each section of the structure that can be blocked off is separately evacuated, then filled with helium at 115 pounds pressure. This helium is then evacuated and the system filled with new helium with all radiation shields in place and with the control and safety rods completely inserted into the reactor. The circulation of water is started through the compressors, the after-coolers, and the heat exchangers. The compressors are then started, to circulate the helium. The control rods are left in the reactor, and the safety rods withdrawn and held. The control circuit A is then set for a neutron density corresponding to about a 70° F. rise in temperature in the reactor. After checking all parts of the system for proper operation, the temperature of the outlet gas is then stepped up at the rate of about 70° F. a day until the desired temperature of 800° F. is attained in the outlet gas. The control circuit A is then set to keep the neutron density sufficiently constant to maintain the desired gas output temperature and the safety circuits B and C set to operate to shut down the system in case of any substantial rise in neutron density or output gas temperature, failure of the circulating system or suspension of power supply from the mains. In accordance with good engineering practice, sufficient standby auxiliaries should be provided for substitution in the system in case of failure of individual units, such as, for example, a compressor. A standby generator may also, if desired, be provided for immediate switchover in case of power main failure. Such standby equipment, however, does not obviate the necessity for adequate safety and emergency control.

In addition to the usual industrial hazards during operation of the power plant, operating personnel must be protected from injury by gamma rays and neutrons generated in the pile reactor and from radiation from the circulating gas and equipment, from beta rays, from close contact with radioactive materials, and from radioactive poisoning due to inhalation of radioactive gases.

The problem of radiation from the pile is met by building the concrete shield, of one foot minimum thickness, around the reactor shell, and filling the intervening space with water which covers the top of the shell to a depth of 8 feet. The minimum thickness of the water layer between the steel shell and the concrete shield is 10 feet. The gas discharge pipes pass downward through this water as near to the shell as practical, so that no extra shielding for them is required until they emerge from the concrete shield somewhat below ground level. These precautions will reduce radiation from the pile structure to 0.10 Roentgen per 8 hr. day at the point of closest possible approach.

Walkways may be built around the concrete shield at the level of the dump valves, and at the level of the housings for the ionization chambers. A stairway and elevator may also be installed, with platforms at each outlet through the radiation shield. Roughly 2200 ft.$^3$/day of an explosive mixture of hydrogen and oxygen will be evolved from the water surrounding the shell. While this gas production is the basis for a "no-smoking" rule near the top of the system and for a requirement for spark-proof electrical equipment, natural ventilation makes other precautions unnecessary.

Many of the problems in connection with protection of personnel arise from the fact that the helium gas will carry some of the fission products with it, emitting both gamma rays and neutrons as it flows. The fraction of the fission products formed which escapes into the gas is, however, less than $2 \times 10^{-4}$. Local deposition of the fission products in, for example, the heat exchangers or the filters will intensify the radiation problem there, but will alleviate it in other locations, such as the compressors.

For protection against radiation from fission products which are in the circulating gas, all lines and equipment are either placed in concrete lined trenches and covered with a sufficient quantity of dirt to provide adequate protection, or housed in thick walled concrete structures. All valves are constructed with an extended bonnet and long stem, as shown in Fig. 15, which permits the stuffing boxes to be carried through the radiation shield for tightening. Stuffing boxes on all large valves may be vented in order to permit the helium that leaks through the stuffing boxes to be collected and returned to the system. Motor driven valves are preferably located at key points in the circulating system so that parts of the system may be blocked off quickly in the event of a line break or serious leak in the system. The valve control system is arranged so that any valve may be operated either from a point near the valve itself or from a main instrument house remote from the system. On any piece of equipment which may be cut out of the system, double valves are installed, one motor driven and one hand operated.

The primary purpose of the gas cleaners or filters is to remove some of the solid fission products from the circulating gas. A less important function is to remove graphite dust from the system. A filter which will remove fine smokes is effective in taking out at least a substantial portion of the solid fission products. A filter element of a special rock wool, of fiber size of the order of 2 to 3 microns, and containing about one pound per square foot of the rock wool, is utilized in the example described.

Figure 20:
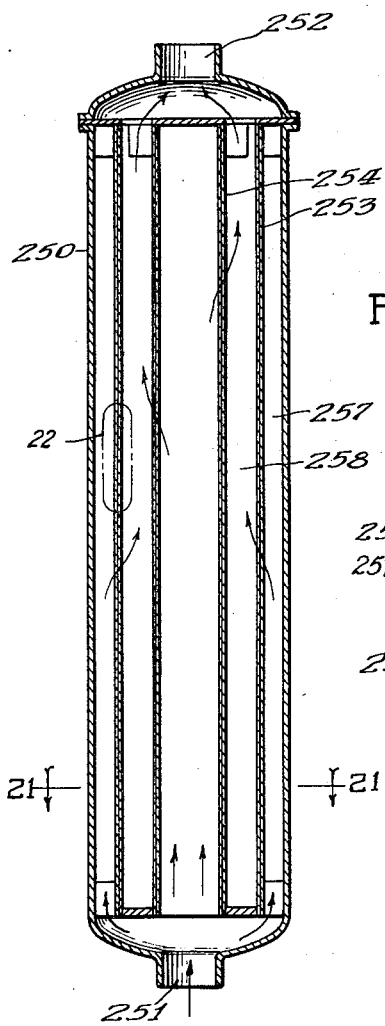
Fig. 20 is a longitudinal sectional view taken through one of the filters diagrammatically illustrated in Fig. 1.
Figure 22:
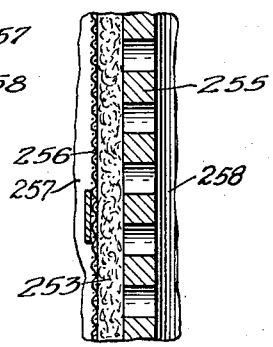
Fig. 22 is an enlarged detail sectional view of the fragment marked 22 on the filter element shown in Fig. 20.
Figure 21:
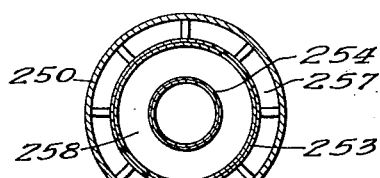
Fig. 21 is a transverse sectional view taken on the line 21—21 of Fig. 20.

Accordingly, the filters 29, shown in Fig. 1, in the circulating system, have been designed on the basis of the smoke filters. Each filter has a cylindrical shell 250 (see Figs. 20 to 22) about 6 feet in diameter and 24 feet long, with 24 inch inlet and outlet nozzles 251 and 252 respectively. The filter consists of two concentric cylinders 253 and 254 of rock wool, supported on a perforated steel plate 255 and held in place with suitable screen 256. The gas flows from the outside 257 of the outer filter and in the inside of the inner filter into the annular space 258 between the two. Gas velocity through the filters is about 0.75 foot per second, and the pressure drop is less than one pound per square inch. Radiation protection around the filters of 8 feet of well packed earth is sufficient and convenient.

Each compressor may be housed in a concrete building with walls 4 feet thick, carrying a 3 foot thick roof made up of precast slabs which can be removed. A crane may be erected on the roof and may be used for erection of the units and for moving heavy parts for repair. Each compresor house may be individually ventilated with a fan, and each compressor may have its own instrument board. The compressor itself may become radioactive in time, but with ten operating compressors and two standbys, for example, it is evident that in a systematic rotation of compressors each machine will be available for examination and cleaning at least once in 30 days. Special precautions to detect compressor leakage may be taken, for example, by using recording chambers in the vent of each stall.

The inhalation hazard for personnel operating the structure can be considered on the basis that the maximum helium leakage which might occur from the system is 1 percent of the volume contained per day, and on the basis that the maximum safe radiation permissible in the lungs is that corresponding to 0.1 Roentgen per day over the whole body.

All ordinary safety precautions can be taken to remove this inhalation danger, and several means can be used dependent on locale of the plant. Among these are (1) to use an odorant such as, for example, ammonia in the helium gas in order to indicate small helium leaks, (2) the use of a powerful fan to blow any escaping helium away from valve packing and other equipment on which work is being done, (3) the use of oxygen masks to prevent breathing escaping helium in locations where the use of a fan is impractical, (4) careful check, under competent supervision, of the radiation to which men are exposed, and relieving any men who have received more than a safe dose of radiation in any one day, (5) periodic medical examination of all personnel.

While the invention has been described with particular reference to a graphite type of moderator, it is to be understood that it is not limited to this moderator and that other neutron slowing materials which do not have an excessive neutron absorbing property may be utilized. For example, heavy water ($D_2O$) or beryllium may be used very effectively for this purpose.

In accordance with a further modification, it is also possible to change the form of the bodies of the uranium bodies which are dispersed in the moderator. For example, the uranium bodies may be in the form of cylinders, spheres or cubes dispersed in a moderator similar to the plates herein described. In such a case some modification of the volume ratio of uranium to moderator may be required. Since the establishment of the proper ratio has been described in other copending applications, for example, an application of Fermi, Serial No. 534,129, filed May 4, 1944, and does not form an essential feature of the present invention it is believed unnecessary to discuss herein the principles involved.

In accordance with a further modification coolants other than helium may be suitable, for example, air, oxygen, or water vapor. The problem in selecting a proper coolant is dependent upon the tendency of the coolant to absorb neutrons. Thus if an excessive quantity of neutrons are absorbed by the coolant, the number of neutrons remaining for absorption by uranium and fission of $U^{235}$ will be insufficeint to permit establishment and maintenance of a self-sustaining chain reaction. Consequently it is desirable to utilize a cooling agent which has but a slight tendency to absorb neutrons and in any event to avoid establishment of a quantity of cooling agents in the reactor of such magnitude that the amount of neutrons absorbed will prevent maintenance of the chain reaction. Coolant gases having a danger coefficient below about 2.5 are found preferable although gases having a danger coefficient as high as 15 are sometimes used.

Within limits the approximate effect of any quantity of coolant may be computed by computing the danger sum of the total quantity of coolant in the reactor at any given time. The danger sum of this coolant may be computed in the manner previously described for computing the danger sum of impurities or neutron absorbers in the reactor simply by determining the weight of coolant in the reactor per unit weight of uranium and the danger coefficient for each impurity or absorber. In no case should the danger sum of the coolant in the reactor be so great as to reduce the reproduction factor K below unity. The permissible danger sum will be determined, therefore, by the magnitude of K of the reactor without the coolant. For example, with a carbon moderator, maximum K obtainable is about 1.1 and in no case can the danger sum of the coolant exceed 0.1 or the chain reaction will no longer be self-sustaining. Preferably in such case the danger sum of the coolant should be maintained below about 0.05. On the other hand, with a moderator which has less tendency to absorb neutrons such as $D_2O$, a maximum K obtainable is approximately 1.3 and in such a case, the danger sum of the coolant should certainly be less than 0.3. Likewise when natural uranium is used in a berryllium moderator, the danger sum should be less than 0.18. Where other neutron absorbers such as impurities or controls are present in the reactor the permissible quantity of coolant is decreased by the danger sum of such absorbers. Moreover most reactors have a substantial leakage factor usually not less than 0.01 K units and thus permissible coolant must be diminished by this factor also. The maximum permissible danger sum may be increased where enriched materials containing concentrations of $U^{235}$ or $94^{239}$ greater than the concentration of $U^{235}$ in natural uranium but in all events the volume of coolant in the reactor should be correlated in accordance with the reproduction factor and/or reproduction ratio to prevent these ratios from decreasing below unit and preferably to permit establishment of a reactor in which the reproduction ratio R is not less than about 1 but not more than about 1.01.

While the invention is particularly concerned with reactors in which natural uranium is used as the source of fissionable isotope, other compositions consisting of or containing fissionable istopes which upon fission yield neutrons may be utilized. For example, enriched compositions containing $U^{235}$, $U^{233}$, or $94^{239}$ dispersed in $U^{238}$ or $Th^{232}$ may be used for this purpose. Compositions containing 5 or 10 percent or even more of the fissionable isotope in such cases may be used and under such conditions a greater latitude in the amount of coolant which may be permitted in the reactor is possible.

Where compositions comprising abnormal amounts of $U^{235}$ or uranium or therein containing $U^{233}$ or $94^{239}$ or similar isotopes are used in the chain reaction some change in the rate of neutron production and consequently some change in the permissible latitude in the amount of impurities or leakage may be encountered. For example as the reactor herein described proceeds in its operation a quantity of 94 is generated which being fissionable takes part in the reaction. Moreover the fission products produced being impurities tend to reduce the K factor but this effect is counteracted to a substantial degree by the neutron output of $94^{239}$ upon fission. After a substantial period of operation of the reactor the K factor may be increased substantially due to the fact that somewhat more neutrons are evolved upon fission of $94^{239}$ than are obtained upon fission of $U^{235}$.

At all events to maintain a self-sustaining chain reaction $Z-(A+B+C+L)$ must not be less than about one where $Z$=number of neutrons produced by fission per neutron consumed in fission of fissioning isotope or isotopes
$A$=number of neutrons absorbed by the non-fissioning isotope for example $U^{238}$, $Th^{232}$ producing fissioning isotope per neutron consumed in fission of fissioning isotopes
$B$=the number of neutrons absorbed by the moderator per neutron consumed in fission
$C$=number of neutrons absorbed by other absorbers impurities or control rods per neutron consumed in fission and
$L$=number of neutrons lost in leakage per neutron consumed in fission Z may be ascertained by bombardment of a pure isotope with neutrons of the energies developed in a reactor.

A, B, and C may be computed to approximate values by computing the danger sum basing the computation upon the ratio of neutron capture cross section and concentration of the moderator, non-fissioning isotope or other absorber to that of the fissioning isotope or isotopes in the manner previously described or may be determined experimentally and L may be determined experimentally. Preferably the value $Z-(A+B+C+L)$ should not exceed unity by more than the fraction of neutrons evolved which are delayed neutrons. In the case of $U^{235}$ this fraction is about 0.01.

Since a coolant is a neutron absorber the amount of coolant within a reactor must be controlled so as to prevent the value C from reaching a value such that the difference between Z and the sum of A, B, C, and L becomes less than one. Preferably this value $A+B+C+L$ should be such that the value $Z-(A+B+C+L)$ is not less than about one nor more than about 1.01.

In this disclosure the helium gas has been shown as being under pressure. Cooling can be effected with the gas at or near atmospheric pressure as shown, for example in a copending case of Enrico Fermi and Leo Szilard, Serial No. 596,465, filed May 29, 1945.

During the operation of the neutronic reactor particularly at high neutron densities radioactive elements of exceedingly high capture cross section may be formed in the uranium as an intermediate element in the decay chains of fission fragments and this formation will lower the value of the reproduction factor for the system. Radioactive xenon[135] is an example of such an intermediate element, this product having a half life of about 9 hours and being formed mostly from radioactive iodine which has a half life of about 6.6 hours and decays to barium. There should be sufficient excess in the available reproduction ratio of the reactor so that in the event the reproduction factor is reduced as a result of the formation of an intermediate decay element having a high capture cross section for neutrons the control rods may be withdrawn sufficiently to maintain the operating reproduction ratio at a value of unity while maintaining the power output at the desired level. It might be desirable to initially construct the reactor sufficiently over-sized to supply this excess reproduction ratio when needed and in this event removable impurities for example in the form of additional shim or control rods may be initially placed in the reactor and kept there at all times until the reproduction ratio commences to fall as the result of the formation of these intermediate decay elements.

While the theory of the nuclear chain fission mechanism in uranium set forth herein is based on the best presently known experimental evidence, we do not wish to be bound thereby, as additional experimental data later discovered may modify the theory disclosed. Any such modification of theory, however, will in no way affect the results to be obtained in the practice of the invention herein described and claimed.

We claim:

1. A device for effecting a self-sustaining neutron chain reaction comprising uranium bodies geometrically arranged in graphite, a shell surrounding the graphite, the shell being spaced slightly from the graphite to provide an expansion space for the graphite, a quantity of helium in the shell and circulated under super atmospheric pressure through the graphite and in heat exchange relationship with the uranium, and a resilient packing in the space between the graphite and the shell to prevent passage of helium therethrough.

2. A device for effecting a self-sustaining neutron chain reaction comprising uranium bodies geometrically arranged in graphite, a shell surrounding the graphite, the shell being spaced slightly from the graphite to provide an expansion space for the graphite, a quantity of helium in the shell and circulated under super atmospheric pressure through the graphite and in heat exchange relationship with the uranium, and asbestos fibre filling the space between the graphite and the shell to prevent passage of helium therethrough.

References Cited in the file of this patent

UNITED STATES PATENTS

| 2,708,656 | Fermi et al. | May 17, 1955 |

FOREIGN PATENTS

| 114,150 | Australia | May 2, 1940 |
| 114,151 | Australia | May 3, 1940 |
| 861,390 | France | Oct. 28, 1940 |
| 233,011 | Switzerland | Oct. 2, 1944 |
| 648,293 | Great Britain | Jan. 31, 1951 |

(Corresponding to French Patent 861,390)

OTHER REFERENCES

Power, July 1940, p. 58.

Smyth: "Atomic Energy for Military Purposes," August 1945.

Goodman: "The Science and Engineering of Nuclear Power," vol. 1, p. 275, Addison-Wesley Press, Inc. (1947).

Kelly et al.: Phy. Rev. 73, 1135–9 (1948).